(12) United States Patent  
Seo et al.

(10) Patent No.: US 10,466,938 B2
(45) Date of Patent: Nov. 5, 2019

(54) NON-VOLATILE MEMORY SYSTEM USING A PLURALITY OF MAPPING UNITS AND OPERATING METHOD THEREOF

(71) Applicant: Samsung Electronics Co., Ltd., Suwon-si, Gyeonggi-do (KR)

(72) Inventors: Dong-young Seo, Suwon-si (KR); Jae-sub Kim, Seoul (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 603 days.

(21) Appl. No.: 15/157,395

(22) Filed: May 17, 2016

(65) Prior Publication Data

US 2017/0052901 A1 Feb. 23, 2017

(30) Foreign Application Priority Data

Aug. 18, 2015 (KR) .................. 10-2015-0116099

(51) Int. Cl.
*G06F 3/00* (2006.01)
*G06F 3/06* (2006.01)

(52) U.S. Cl.
CPC ............ *G06F 3/0688* (2013.01); *G06F 3/061* (2013.01); *G06F 3/0626* (2013.01); *G06F 3/0659* (2013.01)

(58) Field of Classification Search
None
See application file for complete search history.

(56) References Cited

U.S. PATENT DOCUMENTS

| | | | |
|---|---|---|---|
| 7,679,133 B2 | 3/2010 | Son et al. | |
| 7,822,887 B2 | 10/2010 | Torabi et al. | |
| 7,882,320 B2 | 2/2011 | Caulkins | |
| 8,001,316 B2 | 8/2011 | Bar-Or et al. | |
| 8,335,897 B2 | 12/2012 | Feldman et al. | |
| 8,553,466 B2 | 10/2013 | Han et al. | |
| 8,559,235 B2 | 10/2013 | Yoon et al. | |
| 8,654,587 B2 | 2/2014 | Yoon et al. | |
| 8,683,116 B2 | 3/2014 | Bar-Or et al. | |
| 8,806,293 B2 | 8/2014 | Tiziani et al. | |
| 8,838,895 B2 | 9/2014 | Yi et al. | |
| 2010/0251257 A1* | 9/2010 | Kim .................. G06F 9/5027 718/105 |
| 2011/0233648 A1 | 9/2011 | Seol et al. | |
| 2014/0109102 A1* | 4/2014 | Duncan ............ G06F 9/3851 718/103 |
| 2014/0223131 A1* | 8/2014 | Agarwal .......... G06F 13/1615 711/165 |
| 2014/0244964 A1 | 8/2014 | Khayat et al. | |
| 2014/0351675 A1 | 11/2014 | Tiziani et al. | |
| 2014/0365722 A1 | 12/2014 | Yi et al. | |
| 2015/0026698 A1* | 1/2015 | Malakhov .......... G06F 9/5066 718/105 |

* cited by examiner

*Primary Examiner* — Reginald G Bragdon
*Assistant Examiner* — Michael L Westbrook
(74) *Attorney, Agent, or Firm* — Renaissance IP Law Group LLP

(57) ABSTRACT

A method of operating a non-volatile memory system, the method comprising: receiving an access request from a host; generating internal requests by processing the access request by a first central processing unit (CPU) according to a first mapping unit having a first size; and accessing a memory by processing the internal requests by a second CPU according to a second mapping unit having a second size; wherein the first size is different from the second size.

16 Claims, 22 Drawing Sheets

NON-VOLATILE MEMORY SYSTEM USING A PLURALITY OF MAPPING UNITS AND OPERATING METHOD THEREOF

CROSS-REFERENCE TO RELATED APPLICATION

This application claims the benefit of Korean Patent Application No. 10-2015-0116099, filed on Aug. 18, 2015, in the Korean Intellectual Property Office, the disclosure of which is incorporated herein in its entirety by reference.

BACKGROUND

Embodiments relate to a non-volatile memory system, and more particularly, to a non-volatile memory system using multiple mapping units and an operating method thereof.

As a non-volatile memory system storing data in a non-volatile way, flash memory systems have been widely used as voice and image data storage mediums in information devices such as computers, smart phones, personal digital assistants (PDAs), digital cameras, camcorders, voice recorders, MP3 players, or handheld personal computers (PCs)). A memory card such as a solid state drive (SSD) or an embedded multi-media card (e-MMC) is an example of a storage device using a flash memory system.

At least one central processing unit (CPU) may be part of the flash memory system to improve performance thereof. However, when four CPUs for example, are part of the flash memory system to proportionally increase the speed of the flash memory system by four times, system implementation cost may increase.

SUMMARY

An embodiment includes a method of operating a non-volatile memory system, the method comprising: receiving an access request from a host; generating internal requests by processing the access request by a first central processing unit (CPU) according to a first mapping unit having a first size; and accessing a memory by processing the internal requests by a second CPU according to a second mapping unit having a second size; wherein the first size is different from the second size.

An embodiment includes a method of operating a non-volatile memory system, the method comprising: receiving an access request by the non-volatile memory system; generating internal requests by processing the access request according to a first mapping unit having a first size; generating a first logical address indicating a logical location of data corresponding to the internal requests; generating a command by processing the internal requests according to a second mapping unit having a second size; generating, based on the first logical address, a physical address indicating a logical location of data corresponding to the second size; and accessing data according to the command and the physical address.

An embodiment includes a method of operating a non-volatile memory system, the method comprising: receiving an access request from a host; dividing the access request into at least one internal request according to a first mapping unit; generating at least one command by reorganizing each of the at least one internal request according to a second mapping unit; and accessing a memory with the at least one command; wherein a size of the first mapping unit is different from a size of the second mapping unit.

BRIEF DESCRIPTION OF THE DRAWINGS

Embodiments will be more clearly understood from the following detailed description taken in conjunction with the accompanying drawings in which.

DETAILED DESCRIPTION OF THE EMBODIMENTS

Figure 1:
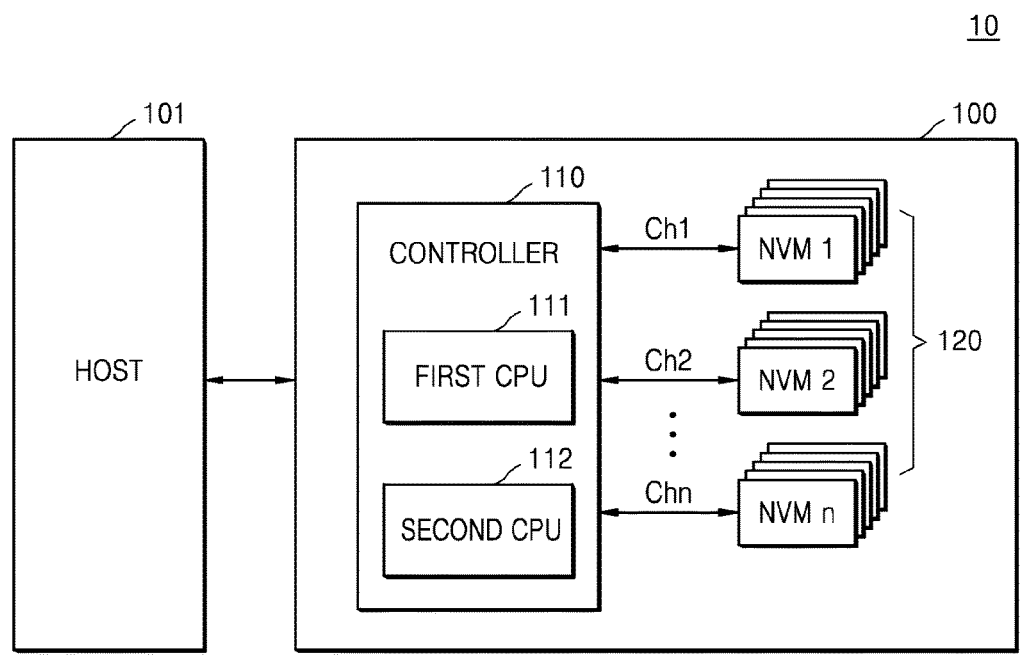
FIG. 1 is a block diagram schematically illustrating a system including a non-volatile memory system, according to an embodiment.

Embodiments will now be described more fully hereinafter with reference to the accompanying drawings, in which particular embodiments are shown. These embodiments are provided so that this disclosure is thorough and complete and fully conveys the scope to one of ordinary skilled in the art. Accordingly, while the embodiments can be modified in various ways and take on various alternative forms, specific embodiments are shown in the drawings and described in detail below as examples. There is no intent to limit all embodiments to the particular forms disclosed. On the contrary, embodiments cover all modifications, equivalents, and alternatives falling within the spirit and scope of the appended claims. Like reference numerals refer to like elements throughout. In the drawings, the thicknesses of layers and regions may be exaggerated for clarity.

The terminology used herein is for the purpose of describing particular embodiments only and is not intended to be limiting of all embodiments. As used herein, the singular forms "a", an, and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first", "second", etc. may be used herein to describe various elements, components, regions, layers and/or sections, these elements, components, regions, layers and/or sections should not be limited by these terms. Thus, a first element, component, region, layer or section discussed below could be termed a second element, component, region, layer or section.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein. As used herein, the term "and/or" includes any and all combinations of one or more of the associated listed items. Expressions such as at least one of, when preceding a list of elements, modify the entire list of elements and do not modify the individual elements of the list.

FIG. 1 is a block diagram schematically illustrating a system 10 including a non-volatile memory system 100 according to an embodiment. Referring to FIG. 1, the system 10 may include a host 101 and the non-volatile memory system 100. The non-volatile memory system 100 may be a solid state drive (SSD). However, other embodiments are not limited thereto; the non-volatile memory system 100 may be realized as an embedded multimedia card (eMMC), a universal flash storage (UFS), a redundant array of independent disks (RAID), or systems.

Various devices may form or be part of the host 101, which is configured to communicate with the non-volatile memory system 100. For example, the host 101 may include a portable electronic device such as a portable multimedia player (PMP), a personal digital assistant (PDA), or a smart phone, an electronic device such as a computer or a high-definition television (HDTV), or an application processor installed in any such electronic devices. The non-volatile memory system 100 is configured to perform a memory operation of writing or reading data in response to an access request for data from the host 101.

The non-volatile memory system 100 may include a controller 110 and at least one non-volatile memory device 120. The controller 110 may be configured to access the non-volatile memory devices 120 through at least one channel. For example, the non-volatile memory system 100 may include n channels Ch1 to Chn and the controller 110 may be configured to access the non-volatile memory devices 120 through the n channels Ch1 to Chn. As an example of operation, the controller 110 may access the non-volatile memory devices 120 in parallel via channels respectively connected to the non-volatile memory devices 120.

The non-volatile memory devices 120 may include a flash memory device. However, this is only an example; other embodiments are not limited thereto. For example, the non-volatile memory devices 120 may include a non-volatile memory such as resistive random access memory (ReRAM), magnetic random access memory (MRAM), phase-change RAM (PRAM), ferroelectric random access memory (Fe-RAM), or the like.

The controller 110 may include at least one central processing unit (CPU) for controlling a memory operation in response to a request from the host 101. In an embodiment, the controller 110 may include a first CPU 111 for processing an operation for interfacing the host 101 and a second CPU 112 for accessing a memory. The first CPU 111 may include at least one CPU capable of processing the request from the host 101 in parallel. Furthermore, the second CPU 112 may include at least one CPU capable of accessing data stored in the non-volatile memory devices 120 in parallel.

The first and second CPUs 111 and 112 may be provided in the non-volatile memory system 100 by various methods. For example, the controller 110 may include one first CPU 111 and two or more second CPUs 112. Alternatively, the controller 110 may include two or more of the first CPUs 111 and two or more of the second CPUs 112. Furthermore, in some embodiments, operating speeds of the first and second CPUs 111 and 112 may be the same or different from each other. For example, an operating speed of the first CPU 111 may be two times faster than that of the second CPU 112.

The first CPU 111 may be configured to perform a host interface operation according to a first process unit. Furthermore, the second CPU 112 may be configured to access a memory according to a second process unit. The first and second process units may respectively include a first mapping unit and a second mapping unit, and each of the first mapping unit and the second mapping unit may be related to a data access unit. The first CPU 111 may be configured to process the request from the host 101 according to the first mapping unit having a prescribed size, and the second CPU 112 may access data according to the second mapping unit having a size that is different from that of the first mapping unit.

When the non-volatile memory devices 120 include a flash memory device, the controller 110 may include a flash translation layer (FTL). The FTL may include system software (or, firmware) for managing writing, reading, and erasing operations of the flash memory device, and may be loaded on a working memory (not shown) in the controller 110 and operated by the second CPU 112. The FTL may include a mapping table including information for converting between a logical address and a physical address.

The first CPU 111 may be configured to generate at least one internal request by processing a data access request received from a host and transmit the at least one internal request to the second CPU 112. Furthermore, referring to a flash memory system, the second CPU 112 may be configured to perform an address conversion operation via the FTL or control data transmission between the non-volatile memory devices 120. The first CPU 111 may be represented as a host CPU (HCPU) configured to perform an operation for interfacing the host, and the second CPU 112 may be represented as an FTL CPU (FCPU) configured to operate the FTL.

According to an embodiment, the first mapping unit of the first CPU 111 and the second mapping unit of the second CPU 112 may be different from each other in size. For example, the first CPU 111 may be configured to divide a data access request (or, group data access requests) from the host 101 according to mapping units. The mapping units of the first CPU 111 may have a first size. Furthermore, the second CPU 112 may be configured to perform an operation for accessing the non-volatile memory devices 120 according to mapping units. The mapping units of the second CPU 112 may have a second size. For example, the first mapping unit may have a size of 8 KB and the second mapping unit may have a size of 4 KB.

Operating speeds of the first and second CPUs 111 and 112 may correspond to each other in order to improve an operating speed of the non-volatile memory system 100. In other words, if a speed of accessing a memory is increased by increasing the number of the second CPUs 112, but the number of the first CPUs 111 performing the host interface operation is not increased, improvement in the operating speed of the non-volatile memory system 100 may be limited.

According to some embodiments, performance of the non-volatile memory system 100 may be improved without increasing the number of the first and second CPUs 111 and 112 proportional to required performance In other words, according to an embodiment, it is possible to improve the performance of the non-volatile memory system 100 while suppressing an increase in the number of CPUs by setting mapping units of the first and second CPUs 111 and 112 in consideration of the operating speeds of the first and second CPUs 111 and 112 such that the mapping units are different from each other. For example, when an operating speed of the first CPU 111 is two times faster than that of the second CPU 112, it may be assumed that an operating speed of X2 for the non-volatile memory system 100 may be realized by using one first CPU 111 and two second CPUs 112. When the first mapping unit of the first CPU 111 is set to a size two times greater than that of the second mapping unit of the second CPU 112 according to an embodiment, an operating speed of X4 for the non-volatile memory system 100 may be realized by using one first CPU 111 and four second CPUs 112.

In other words, according to various embodiments, the cost for improving the operating speed of the non-volatile memory system 100 may be reduced; furthermore, an integration degree of the non-volatile memory system 100 may be improved.

Figure 2:
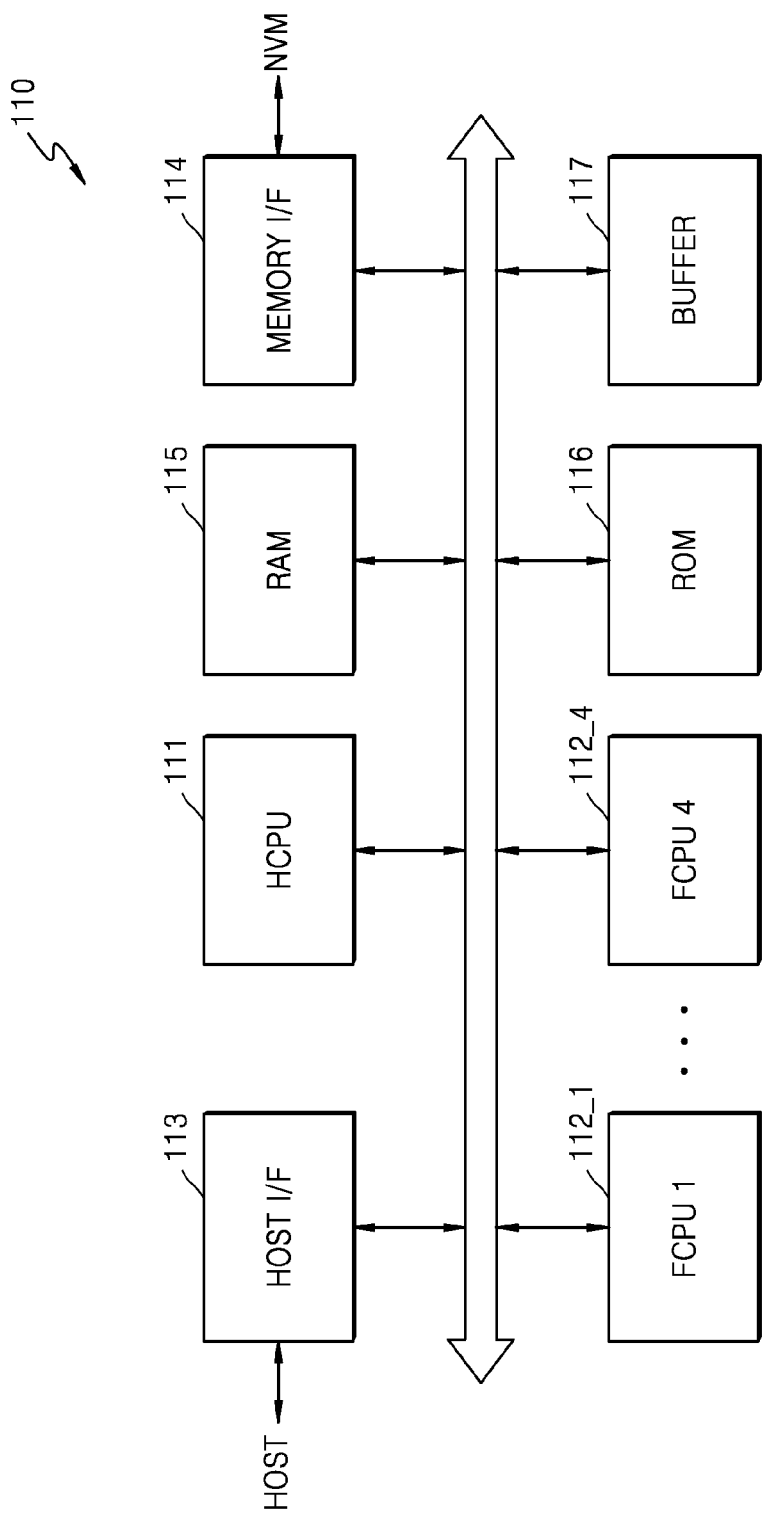
FIG. 2 is a block diagram illustrating an embodiment of a controller of FIG. 1.

FIG. 2 is a block diagram illustrating an embodiment of the controller 110 of FIG. 1. Referring to FIGS. 1 and 2, the controller 110 may include an HCPU 111, multiple FCPUs 112_1 to 112_4, a host interface 113, a memory interface 114, random access memory (RAM) 115, read-only memory (ROM) 116, and a buffer 117. For example, one HCPU 111 and first to fourth FCPUs 112_1 to 112_4 may be included in the controller 110. However, the number of HCPUs and FCPUs included in the controller 110 as described above may be different in other embodiments.

The host interface 113 may be configured to provide a physical connection between a host and the non-volatile memory system 100. For example, the host interface 113 may be configured according to various interface standards/techniques such as an advanced technology attachment (ATA), a serial ATA (SATA), an external SATA (e-SATA), a small computer system interface (SCSI), a serial attached SCSI (SAS), a peripheral component interconnection (PCI), PCI express, NVM Express (NVMe), IEEE 1394, Fiber channel, Ethernet, remote direct memory access (RDMA), Infiniband, a universal serial bus (USB), a secure digital (SD) card, a multimedia card (MMC), an embedded MMC (eMMC), or a compact flash (CF) card interface.

The memory interface 114 may be configured to provide a physical connection between the memory controller 110 and the non-volatile memory devices 120. For example, command, address, and data may be transmitted between the memory controller 110 and the non-volatile memory devices 120 through the memory interface 114. Both data requested to be written by the host and data read from the non-volatile memory devices 120 may be temporarily stored in the buffer 117. The buffer 117 may include a cache, ROM, programmable ROM (PROM), erasable programmable ROM (EPROM), electrically erasable programmable ROM (EEPROM), phase-change RAM (PRAM), flash memory, static RAM (SRAM), dynamic random access memory (DRAM), a combination of such devices or similar devices, or the like.

The RAM 115 may be used as a working memory. The HCPU 111 and the first to fourth FCPUs 112_1 to 112_4 may be configured to provide control a general operation of the controller 110 via firmware, and the firmware may be loaded on the RAM 115. The RAM 115 may be realized by at least one of various memories such as, for example, a cache memory, DRAM, SRAM, PRAM, and flash memory devices.

As an example of the firmware, a FTL may be loaded on the RAM 115 and various functions may be performed via the FTL. For example, the FTL may include a wear-leveling function for managing a wear-level with respect to memory cells and an address conversion function for converting a logical address from a host into a physical address indicating physical locations of the memory cells. ROM 116 may store boot code required for initial booting of a system for operating the non-volatile memory system 100, and further, may store various code capable of being executed by the HCPU 111 and the first to fourth FCPUs 112_1 to 112_4 for general control by the controller 110. According to an embodiment, a management operation which sets mapping units of the HCPU 111 and the first to fourth FCPUs 112_1 to 112_4 may be performed by executing code stored in the ROM 116.

The HCPU 111 may be configured to divide a request from the host according to a first mapping unit into requests (for example, internal requests). Furthermore, the HCPU 111 may be configured to transmit the internal requests according to the first mapping unit to the first to fourth FCPUs 112_1 to 112_4. For example, when the first mapping unit has a size of 8 KB and a request for data writing/reading having a size of 32 KB is received from the host, the HCPU 111 may divide the request from the host into four internal requests and may respectively transmit the four internal requests to the first to fourth FCPUs 112_1 to 112_4. The size of each of the internal requests may be 8 KB, and each of the internal requests may be a data write/read request. Each of the first to fourth FCPUs 112_1 to 112_4 may be configured to process the assigned internal request, and may divide the internal request of 8 KB into internal requests of 4 KB in size and perform a memory access operation, for example, when a second mapping unit has a size of 4 KB.

An address conversion operation converting a logical address into a physical address according to the first and second mapping units may be performed. For example, the host may provide a logical address (for example, a host logical address) indicating data by a prescribed size unit (for example, 512 B) to the non-volatile memory system 100.

For example, when the HCPU 111 receives a request from the host to access 32 KB of data, the HCPU 111 may be configured to divide the request from the host into four internal requests each representing access to 8 KB of data. Furthermore, the HCPU 111 may be configured to generate a logical address (for example, a first logical address) indicating a logical location of 8 KB of data corresponding to each of the internal requests.

Each of the first to fourth FCPUs 112_1 to 112_4 may be configured to process the internal request of 8 KB according to the second mapping unit of 4 KB. For example, the first FCPU 112_1 may be configured to convert a logical address of 8 KB into two physical addresses indicating physical locations of memory, each location storing 4 KB of data. The address conversion operation may be performed via the FTL loaded on the RAM 115. In other words, by the address conversion operation converting the logical address for accessing 8 KB of data, first and second physical addresses for respectively accessing data of 4 KB are generated, and 4 KB of data located at the first physical address and 4 KB of data located at the second physical address may be accessed.

By setting the mapping units as described above, an operating speed of the non-volatile memory system 100 may be improved by using a smaller number of CPUs (for example, a smaller number of HCPU). That is, since it is advantageous for a memory interface unit (or, a data access unit) to have a relatively small size, the number of FCPUs needs to be increased in order to improve an operating speed of the non-volatile memory system 100 while maintaining the sizes of the mapping units of the FCPUs as 4 KB. However, according to an embodiment, performance of the non-volatile memory system 100 may be improved without increasing the number of HCPUs proportional to an increase in the number of FCPUs. In other words, an increase in the number of HCPUs may be minimized.

For example, when the first mapping unit is 4 KB and a data processing speed of the HCPU 111 is 1000 MB/s, it is possible to increase the data processing speed of the HCPU 111 to 2000 MB/s by setting the first mapping unit of the HCPU 111 to 8 KB. When the data processing speed is assumed to be 500 MB/s, each of the first to fourth FCPUs 112_1 to 112_4 may realize performance of 2000 MB/s by using one HCPU 111 having a mapping unit set to 8 KB and four FCPUs 112_1 to 112_4 having a mapping unit set to 4 KB.

Figure 3A:
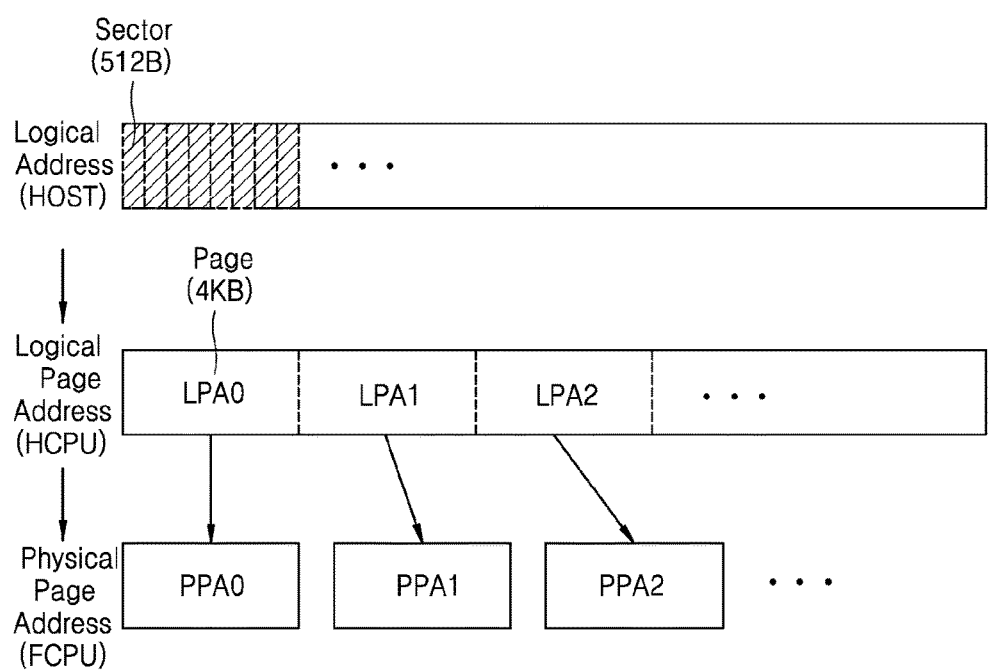
FIGS. 3A and 3B are block diagrams illustrating an address conversion operation and a structure of a memory cell array, according to an embodiment.
Figure 3B:
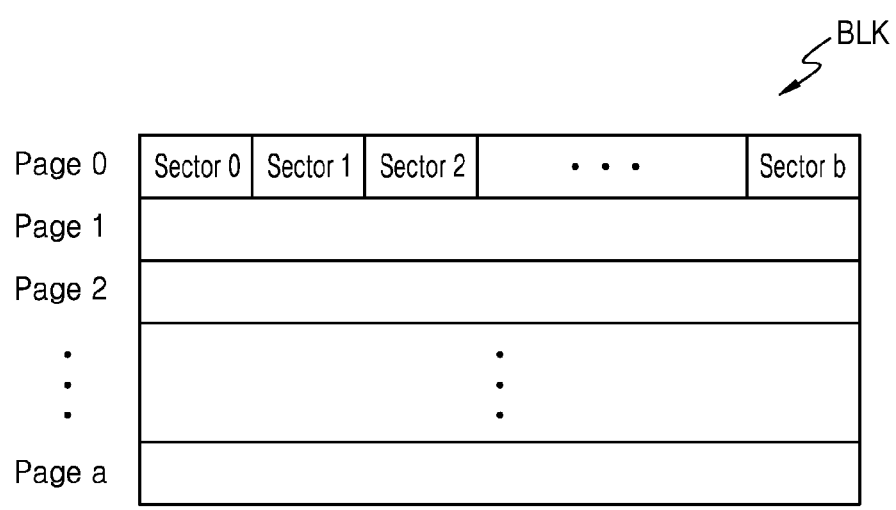

FIGS. 3A and 3B are block diagrams illustrating an address conversion operation and a structure of a memory cell array, according to an embodiment. FIGS. 3A and 3B illustrate examples of setting sizes of mapping units used by an HCPU and an FCPU as 4 KB, identically.

Referring to FIGS. 3A and 3B, when a host requests data as illustrated in FIG. 3A, a logical address indicating a logical location requested for the data access according to a prescribed unit (for example, a sector of 512 B) may be provided in a non-volatile memory system.

The HCPU may be configured to process the request from the host according to the mapping unit of 4 KB. The first mapping unit of 4 KB may correspond a size of one page included in a block BLK of a non-volatile memory device as illustrated in FIG. 3B. For example, when the HCPU receives a request from the host to access 32 KB of data, the HCPU may divide the request into eight internal requests each requesting access to 4 KB of data. Furthermore, the HCPU may generate logical addresses (for example, logical page addresses, LPA 0 to LPA 7) corresponding to the eight internal requests.

Each of the FCPUs may be configured to receive and process one of the internal requests requesting access to 4 KB of data. For example, receiving the internal request and a first logical page address LPA 0 corresponding thereto, the FCPU may convert the first logical page address LPA 0 into a first physical page address PPA 0 through an address conversion operation and may access data stored in a memory cell located at the first physical page address PPA 0.

As illustrated in FIG. 3B, the non-volatile memory device may include multiple blocks and each block BLK may include multiple pages Page 0 to Page a. Furthermore, each page may include multiple sectors Sector 0 to Sector b. The sectors may be variously defined, and may be, for example, error detection/correction units.

Figure 4:
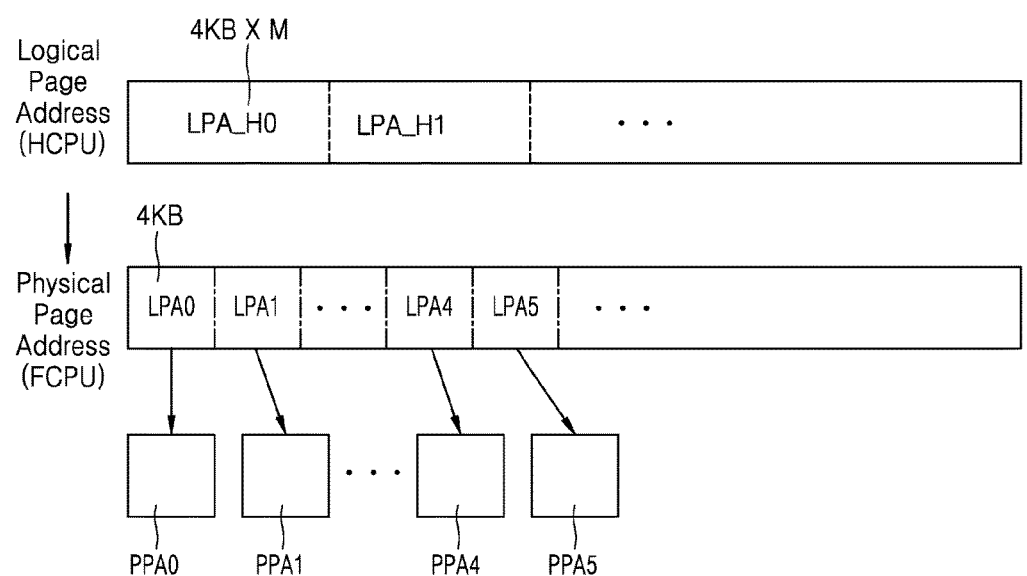
FIG. 4 is a block diagram of a first mapping unit and a second mapping unit that are different from each other in size, according to an embodiment.

FIG. 4 is a block diagram of a first mapping unit and a second mapping unit that are different from each other in size, according to an embodiment. An address conversion operation illustrated in FIG. 4 is only an example, and addresses may be transformed differently according to other embodiments.

Referring to FIGS. 2 and 4, the HCPU 111 may be configured to divide the request from the host into multiple internal requests according to a first mapping unit (for example, 4*M KB) according to an embodiment. Furthermore, the HCPU 111 may be configured to provide logical addresses (for example, first logical addresses, LPA_H0, . . . LPA_H1) corresponding to the internal requests. The first mapping unit may have a relatively large size, for example, constant multiples of a size of a physical page (for example, 4 KB). Therefore, the first logical addresses LPA_H0, . . . LPA_H1 may be addresses for indicating two or more pages.

Each of the first to fourth FCPUs 112_1 to 112_4 may be configured to process the internal request provided from the HCPU 111 according to the second mapping unit (for example, 4 KB). For example, each of the FCPUs 112_1 to 112_4 may be configured to generate the second logical addresses LPA 0, LPA 1, . . . corresponding to a size of the second mapping unit from the first logical addresses LPA_H0, LPA_H1, . . . . Furthermore, each of the first to fourth FCPUs 112_1 to 112_4 may be configured to convert each of the second logical addresses LPA 0, LPA 1, . . . into physical addresses PPA 0, PPA 1, . . . through an address conversion operation and access memory cells in a location corresponding to the physical addresses PPA 0, PPA 1, . . . . As the first and second mapping units are different from each other in size, M physical address may be generated from one of the first logical addresses.

Figure 5:
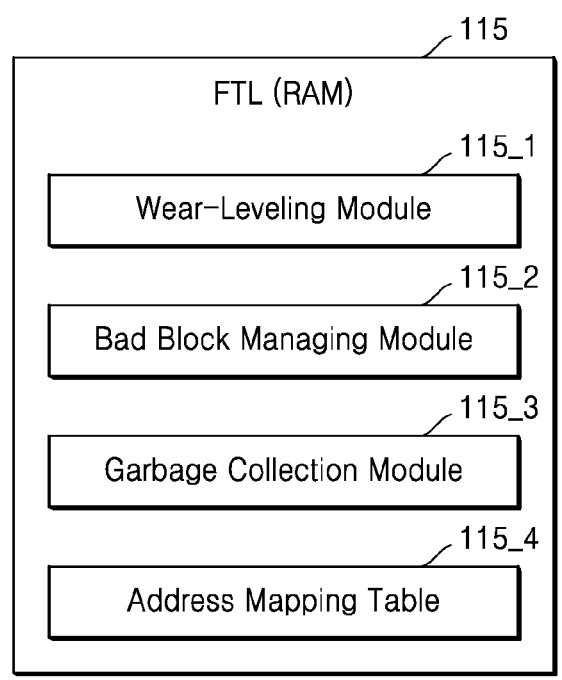
FIG. 5 is a block diagram of a flash translation layer (FTL) loaded on random access memory (RAM) of FIG. 2, according to an embodiment.

FIG. 5 is a block diagram of a flash translation layer (FTL) loaded on the RAM 115 of FIG. 2, according to an embodiment. As described above, the FTL may be loaded on the RAM 115 as firmware and may include a wear-leveling module 115_1, a bad block management module 115_2, a garbage collection module 115_3, and an address mapping table 115_4.

Referring to FIGS. 1 to 5, the first to fourth FCPUs 112_1 to 112_4 may be configured to perform various management operations with respect to the non-volatile memory devices 120 via the FTL. The wear-leveling module 115_1 may be configured to manage a wear-level with respect to memory cells of the non-volatile memory devices 120. The wear-leveling module 115_1 may be configured to prevent abrasion from occurring faster in a specific cell region compared to other cell regions by managing program and erase cycles with respect to memory cells of the non-volatile memory devices 120.

The bad block management module 115_2 may be configured to manage blocks having a defect from among multiple blocks provided in the non-volatile memory devices 120. For example, a block having deteriorated characteristics due to an increased number of program/erase cycles may be identified as a bad block. The bad block management module 115_2 may be configured to manage the address mapping table 115_4 so as to prevent data from being written to the block identified as a bad block.

The garbage collection module 115_3 may be configured to collect blocks in which several pieces of split data are stored. For example, a data erase unit (for example, a block unit) may be set to be larger than a data recording unit (for example, a page unit) in the non-volatile memory devices 120. Continuous data that are dispersed in physically different locations may be collected in a free block after repeated program/erase operations. A new free block may be generated according to an operation of the garbage collection module 115_3.

The first to fourth FCPUs 112_1 to 112_4 may be configured to convert a logical address into a physical address by using information stored in the address mapping table 115_4. As described above, each of the first to fourth FCPUs 112_1 to 112_4 may be configured to generate the second logical addresses LPA 0, LPA 1, . . . corresponding to a size of 4 KB from the first logical addresses LPA_H0, LPA_H1, . . . and further, may convert the second logical addresses LPA 0, LPA 1, . . . into the physical addresses PPA 0, PPA 1, . . . according to the address mapping table 115_4.

Figure 6:
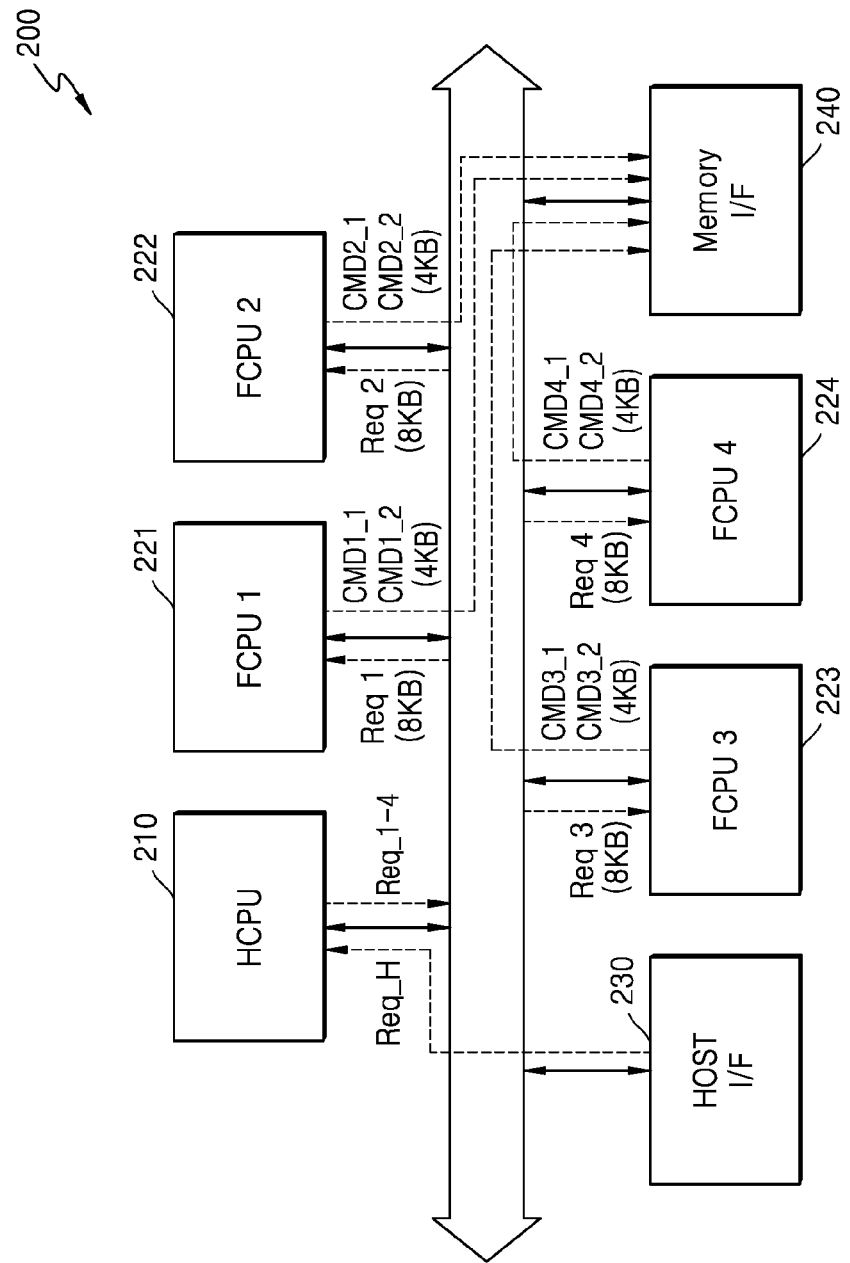
FIG. 6 is a block diagram of a non-volatile memory system according to some embodiments.

FIG. 6 is a block diagram of a non-volatile memory system according to some embodiments. FIG. 6 illustrates a configuration of a controller provided in a non-volatile memory system 200 and a general operating concept thereof. Furthermore, although FIG. 6 illustrates one HCPU 210 and four FCPUs 221 to 224, the number of HCPUs and the FCPUs provided in the non-volatile memory system 200 may be different in other embodiments.

The non-volatile memory system 200 may include the HCPU 210, the first to fourth FCPUs 221 to 224, the host interface 230, and the memory interface 240. When an access request Req_H is received from a host through the host interface 230, the HCPU 210 may generate internal requests Req1 to Req4 of 8 KB and respectively transmit the four internal requests to the first to fourth FCPUs 221 to 224. The internal requests Req1 to Req4 may be equally transmitted in 8 KB units to the FCPUs, and the first to fourth FCPUs 221 to 224 may respectively receive the internal requests along with corresponding logical addresses.

Each of the first to fourth FCPUs 221 to 224 accesses data according to a second mapping unit. For example, the first FCPU 221 may divide the received internal request Req1 into 4 KB units and may access data. From a logical address (for example, a first logical address) provided by the HCPU 210, two second logical addresses respectively corresponding to a size of the second mapping unit may be generated, and a physical address corresponding to the second logical address may be generated by using an FTL including mapping information for mapping the second logical address and the physical address.

The first FCPU 221 may control the non-volatile memory system so that commands and the physical address corresponding to 4 KB mapping units may be provided to a non-volatile memory device through the memory interface 240. For example, the first FCPU 221 may process the received internal request Req1 and may respectively provide two commands CMD1_1 and CMD1_2 commanding data access according to 4 KB mapping units to the non-volatile memory device through the memory interface 240. In a similar way, each of the second to fourth FCPUs 221 to 224 may respectively provide two commands commanding data access according to 4 KB mapping units to the non-volatile memory device through the memory interface 240 by processing the corresponding internal requests Req 2 to Req 4.

Figure 7:
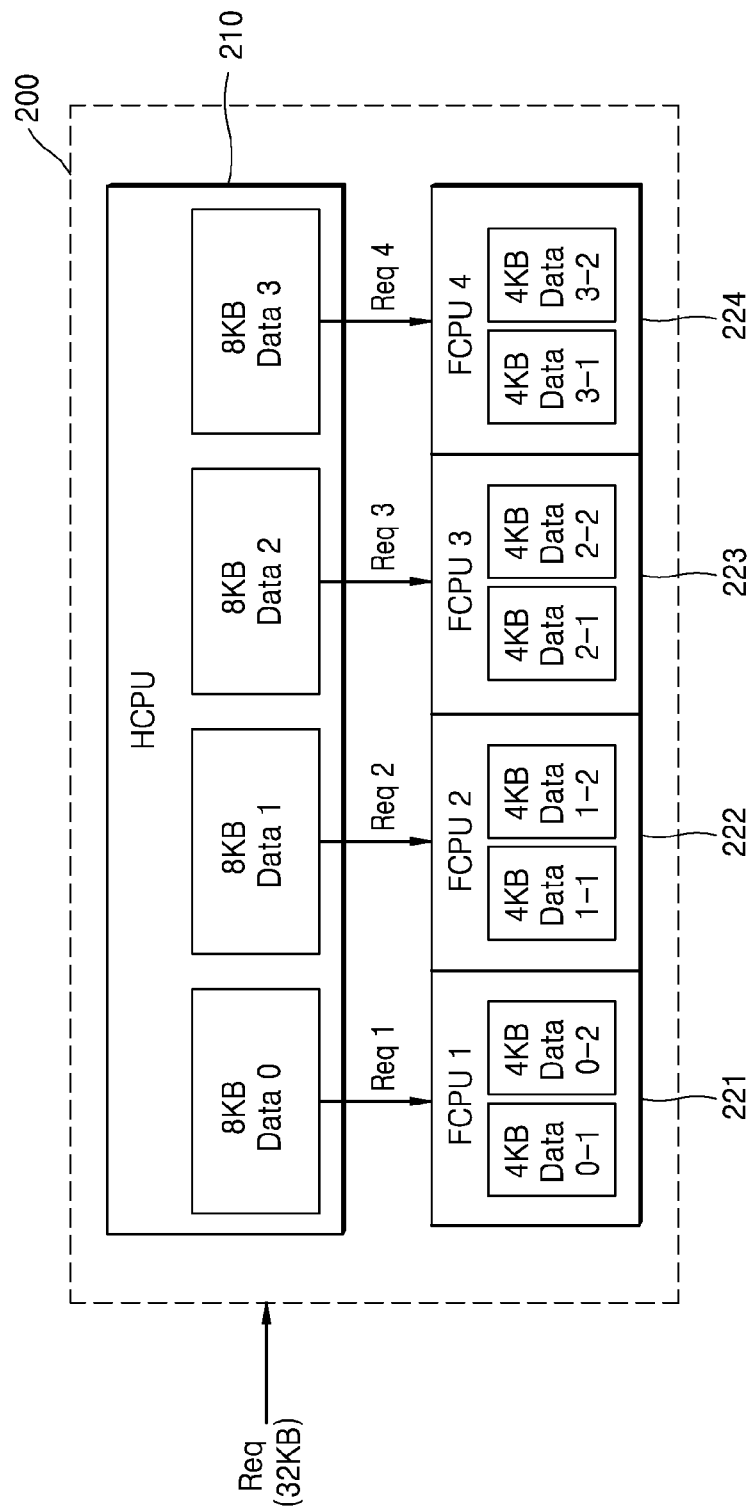
FIG. 7 is a block diagram illustrating an operation of a memory controller according to mapping units applied to FIG. 6.

FIG. 7 is a block diagram illustrating an operation of a memory controller according to the mapping units applied to FIG. 6. As illustrated in FIG. 7, when an access request Req for 32 KB of data is received from a host, the HCPU 210 may divide the request into first to fourth internal requests Req 1 to Req 4 according to a first mapping unit of 8 KB. Data to be accessed according to the first to fourth internal requests Req 1 to Req 4 correspond to first to fourth data Data 0 to Data 3, and each of the first to fourth data Data 0 to Data 3 has a size of 8 KB. Furthermore, the first to fourth internal requests Req 1 to Req 4 may be transmitted to first to fourth FCPUs 221 to 224, respectively.

The first FCPU 221 may access data by dividing the first internal request Req 1 into two. Therefore, the first FCPU 221 may control the non-volatile memory system 200 so that a command and a physical address for accessing 4 KB of first data Data 0, illustrated as Data 0-1, and the other command and physical address for accessing 4 KB of first data Data 0, illustrated as Data 0-2, may be provided to the non-volatile memory device.

In a similar way, the second FCPU 222 may receive the second internal request Req 2, divide second data Data 1 into two 4 KB units, Data 1-1 and Data 1-2, and process the second data Data 1. Also, the third FCPU 223 may receive the third internal request Req 3, divide third data Data 2 into two 4 KB units, Data 2-1 and Data 2-2, and process the third data Data 2. Furthermore, the fourth FCPU 224 may receive the fourth internal request Req 4, divide fourth data Data 3 into two 4 KB units, Data 3-1 and Data 3-2, and process the fourth data Data 3.

Figure 8:
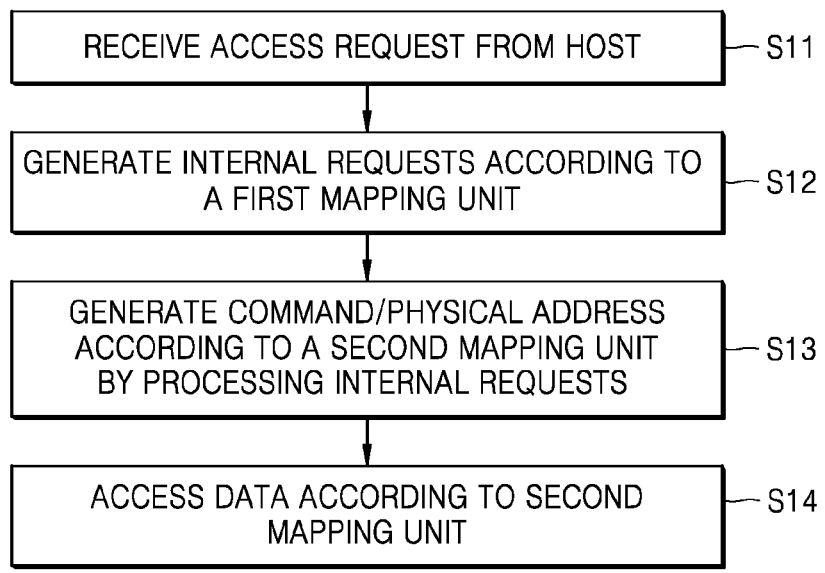
FIGS. 8 and 9 are flowcharts illustrating a method of operating a non-volatile memory system, according to some embodiments.
Figure 9:
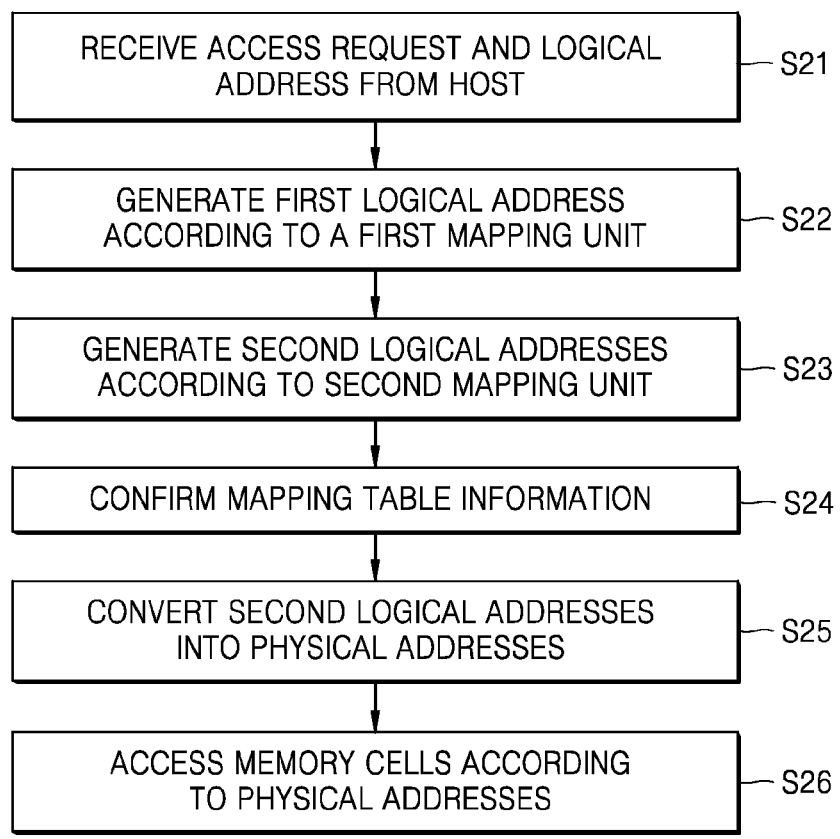

FIGS. 8 and 9 are flowcharts illustrating a method of operating a non-volatile memory system, according to some embodiments. As illustrated in FIG. 8, the non-volatile memory system receives an access request from a host (S11), and a first CPU (for example, an HCPU) generates multiple internal requests by processing the request from the host according to a first mapping unit (S12). Furthermore, for interfacing with memory, a second CPU (for example, an FCPU) receives the internal requests and generates a command/physical address according to a second mapping unit by processing the internal requests (S13). The embodiments described above may be implemented by a configuration of the first and second CPUs, and a method of setting the first and second mapping units. In other words, the non-volatile memory system may include a various number of the first and second CPUs and the first and second mapping units may be set so as to have a variety of sizes. In one embodiment, the number of second CPUs is larger than that of the number of first CPUs and the size of the first mapping unit may be larger than that of the second mapping unit. For example, the first mapping unit may be set to 8 KB and the second mapping unit to 4 KB.

As described above, a command/physical address corresponding to 4 KB mapping units is generated and provided to a non-volatile memory device. The non-volatile memory device accesses data according to the second mapping unit in response to the command/physical address (S14). In other words, the non-volatile memory device performs a memory operation such as writing or reading by decoding the received command, and further, according to the physical address indicating a logical location of a memory region of 4 KB, accesses data located in a corresponding location.

FIG. 9 illustrates the memory operation according to an embodiment with regard to address conversion. As illustrated in FIG. 9, a non-volatile memory system receives an access request from a host and further receives a logical address (for example, a host logical address) corresponding to the access request (S21). An access request for data of various sizes, for example, an access request for 32 KB of data, may be received from the host. An HCPU provided in the non-volatile memory system may process the request according to a first mapping unit of 8 KB.

The HCPU generates multiple internal requests according to the first mapping unit in response to the access request from the host, and further, generates a first logical address corresponding to the first mapping unit in response to each of the internal requests (S22). The first logical address may indicate a location of 8 KB of data.

The internal requests are provided to at least one FCPU and each FCPU generates multiple second logical addresses according to a second mapping unit (S23). For example, when the second mapping unit is 4 KB, each FCPU may generate, based on the first logical address, two of the second logical addresses, each indicating a logical location of 4 KB of data. Furthermore, the FCPU may confirm mapping table information included in an FTL (S24), and may convert the second logical addresses into physical addresses according to the confirmation result (S25). The non-volatile memory device may perform an operation for accessing memory cells located at the physical addresses (S26).

Figure 10:
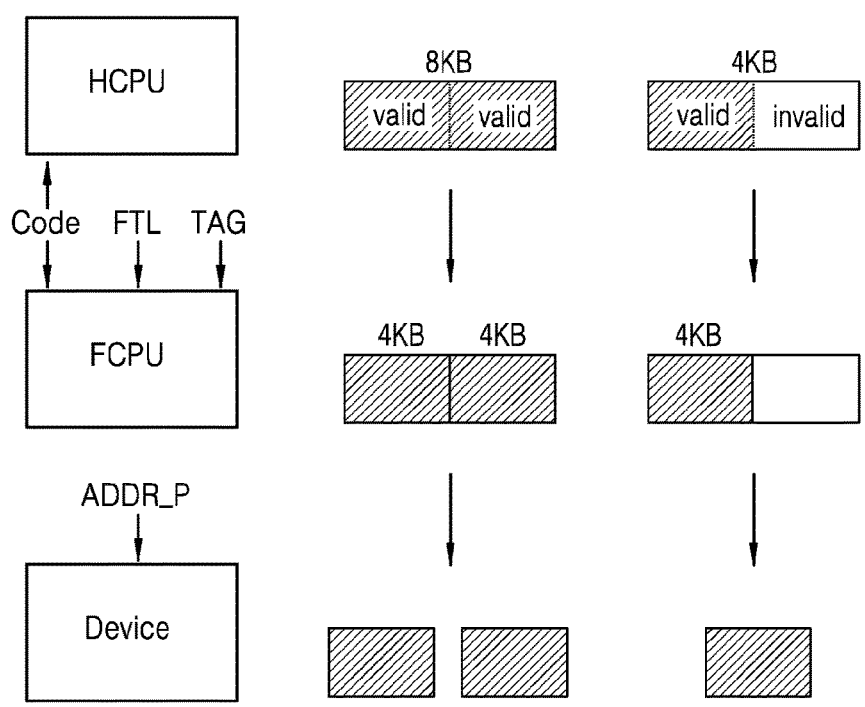
FIG. 10 is a block diagram illustrating an operation of a non-volatile memory system, according to an embodiment.

FIG. 10 is a block diagram illustrating an operation of a non-volatile memory system, according to an embodiment. FIG. 10 illustrates an example of transmitting at least one piece of tag information TAG between an HCPU and an FCPU.

The HCPU and the FCPU may process an access request according to first and second mapping units, respectively. An operation according to the mapping units may be performed by executing a code (for example, a code stored in ROM) disposed in the non-volatile memory system. Furthermore, the FCPU may perform an address conversion operation according to the second mapping unit, and for example, via firmware included in an FTL.

The HCPU may generate the at least one piece of tag information TAG according to a processing result of the access request provided from a host and may provide the tag information TAG to the FCPU. For example, the HCPU may generate internal requests by processing the access request from the host according to the first mapping unit of 8 KB. However, based on a size of data requested for access from the host, some of the internal requests may include an access request for data smaller than 8 KB.

The HCPU may provide tag information TAG representing whether the access request for data is valid by a prescribed unit to the FCPU. For example, tag information TAG representing whether the access request for data is valid according to the second mapping unit (for example, 4 KB) may be provided to the FCPU. The FCPU may access a memory with reference to the tag information TAG from the HCPU. As a result of confirming the tag information TAG, when the internal requests include two valid access requests of 4 KB each, the FCPU provides a physical address ADDR_P for accessing memory cells located in two physical locations, respectively, each memory cell storing 4 KB of data. In contrast, when the internal requests include one valid request of 4 KB only, the FCPU provides a physical address ADDR_P for accessing memory cells located in one physical location, each memory cell storing 4 KB of data.

Figure 11:
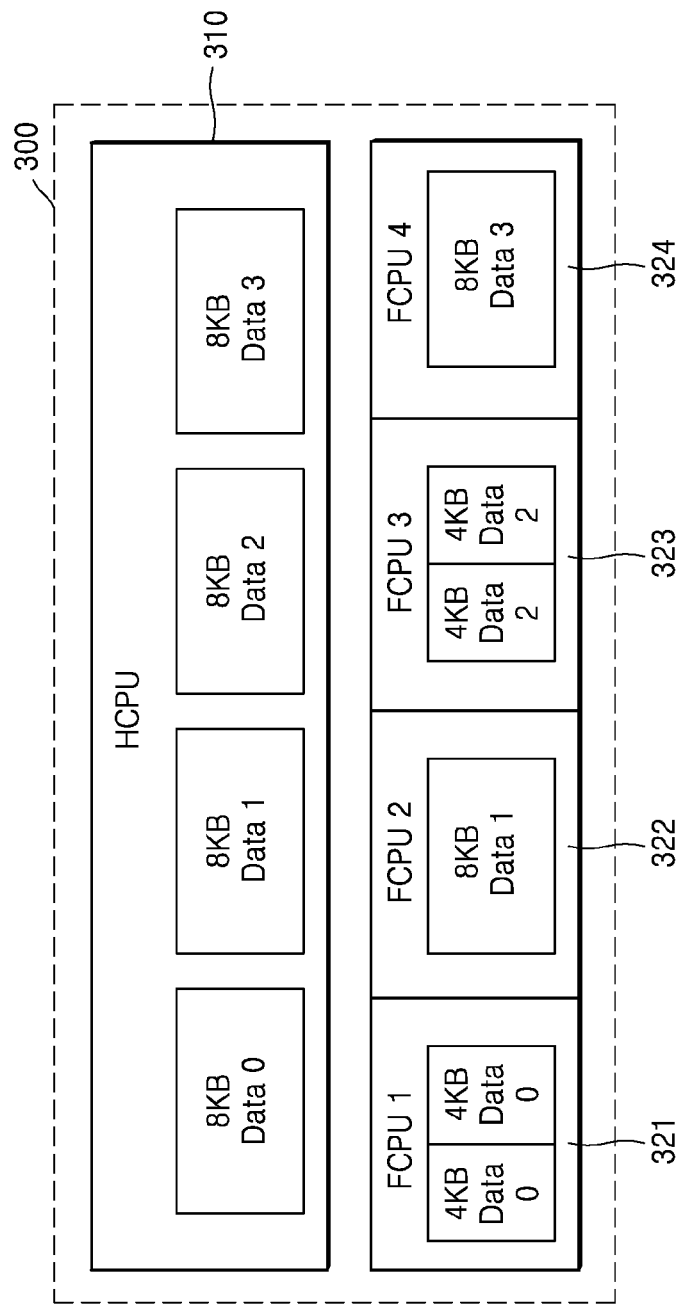
FIGS. 11 to 18 are block diagrams illustrating various examples of mapping units applied to a non-volatile memory system, according to various embodiments.

FIGS. 11 to 18 are block diagrams illustrating various examples of mapping units applied to a non-volatile memory system, according to various embodiments. FIG. 11 illustrates an example in which mapping units of multiple FCPUs provided in the non-volatile memory system are set different from each other. For example, an HCPU 310 and first to fourth FCPUs 321 to 324 may be arranged in a non-volatile memory system 300, and a first mapping unit of the HCPU 310 may be set to 8 KB. Second mapping units of some of the first to fourth FCPUs 321 to 324 (for example, the first and third FCPUs) may be set to 4 KB, i.e., different from the HCPU 310, while second mapping units of other FCPUs (for example, the second and fourth FCPUs), are set to 8 KB, i.e., the same as the HCPU 310. Therefore, the second and fourth FCPUs 322 and 324 may access data two times faster than the first and third FCPUs 321 and 323.

When it is assumed that the HCPU 310 receives an access request for 32 KB of data from a host, the HCPU 310 respectively generates internal requests each requesting access to 8 KB of data and provides the internal requests to the first to fourth FCPUs 321 to 324. Each of the first and third FCPUs 321 and 323 has a second mapping unit of 4 KB. Therefore, it is possible to divide data into two 4 KB units and process the 4 KB units.

However, since each of the second and fourth FCPUs 322 and 324 has a second mapping unit of 8 KB, it is possible to process data in 8 KB units. For example, the second FCPU 322, with respect to second data Data 1 of 8 KB, may perform an address conversion operation in 8 KB units, may generate a physical address indicating a logical location of memory cells of 8 KB and provide the physical address to a non-volatile memory device. In a similar way, the fourth FCPU 324, with respect to fourth data Data 3 of 8 KB, may generate a physical address indicating a logical location of memory cells of 8 KB and provide the physical address to a non-volatile memory device.

According to an embodiment illustrated in FIG. 11, it is possible to variously set a unit (for example, a memory I/O unit) accessing data of the non-volatile memory device, and further, access speed may further be improved compared to when each of the first to fourth FCPUs 321 to 324 has an identical mapping unit of 4 KB.

Figure 12:
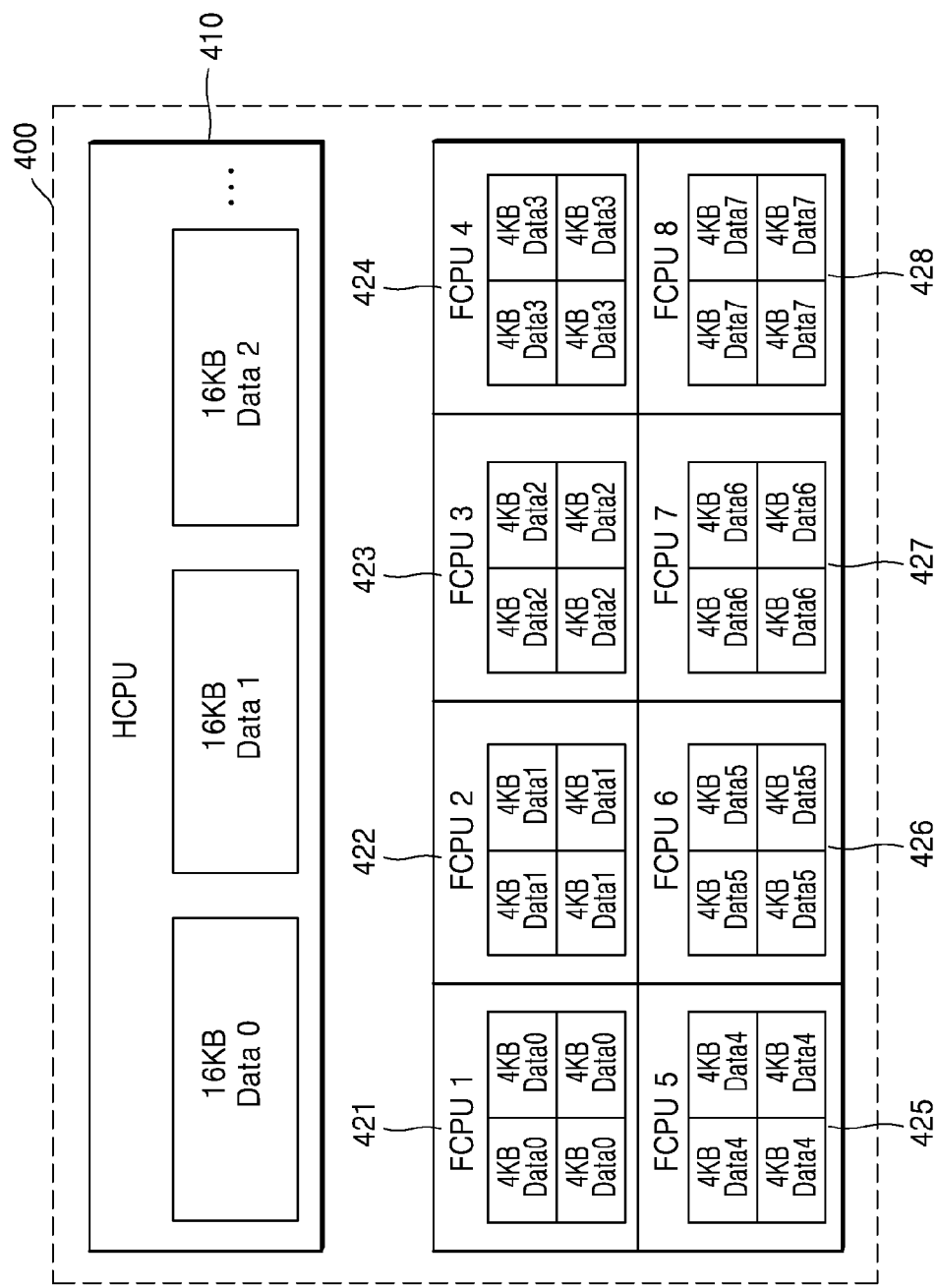

FIG. 12 illustrates an example in which a size of a mapping unit of an HCPU arranged in a non-volatile memory system is further increased, for example, an example in which a size of a mapping unit of an HCPU is four times larger than that of a mapping unit of an FCPU. As illustrated in FIG. 12, a non-volatile memory system 400 may include an HCPU 410 and multiple FCPUs. For example, the non-volatile memory system 400 may include first to eighth FCPUs 421 to 428. A first mapping unit of the HCPU 410 may be set to 16 KB. Meanwhile, second mapping units of the first to eighth FCPUs 421 to 428 may be set to 4 KB.

When a data access request is received from a host, the HCPU 410 divides the data access request according to a mapping unit of 16 KB and provides internal requests to the first to eighth FCPUs 421 to 428. For example, a first internal request for accessing first data Data 0 of 16 KB is provided to the first FCPU 421 and a second internal request for accessing second data Data 1 of 16 KB is provided to the second FCPU 422. Therefore, the internal requests may be equally provided to the first to eighth FCPUs 421 to 428 as described above.

Each of the first to eighth FCPUs 421 to 428 may divide and process an internal request of 16 KB according to the second mapping units of 4 KB. For example, the first FCPU 421 may access first data Data 0 of 16 KB by dividing the first data Data 0 into four 4 KB units. In other words, each of the first to eighth FCPUs 421 to 428 may provide a command and a physical address for accessing data in 4 KB units to a non-volatile memory device.

According to an embodiment of FIG. 12, when a data processing speed of an HCPU is 1000 MB/s and that of each FCPU is 500 MB/s, it is possible to increase an operating speed of the non-volatile memory system 400 by four times without increasing the number of HCPUs. For example, in the embodiment of FIG. 12, when a data processing speed of 1000 MB/s is realized by one HCPU and two FCPUs, and the mapping unit of each HCPU and FCPU is set to 4 KB, it is possible to realize the data processing speed of 4000

MB/s by using one HCPU having the first mapping unit set to 16 KB and eight FCPUs having respective second mapping units set to 4 KB.

Figure 13:
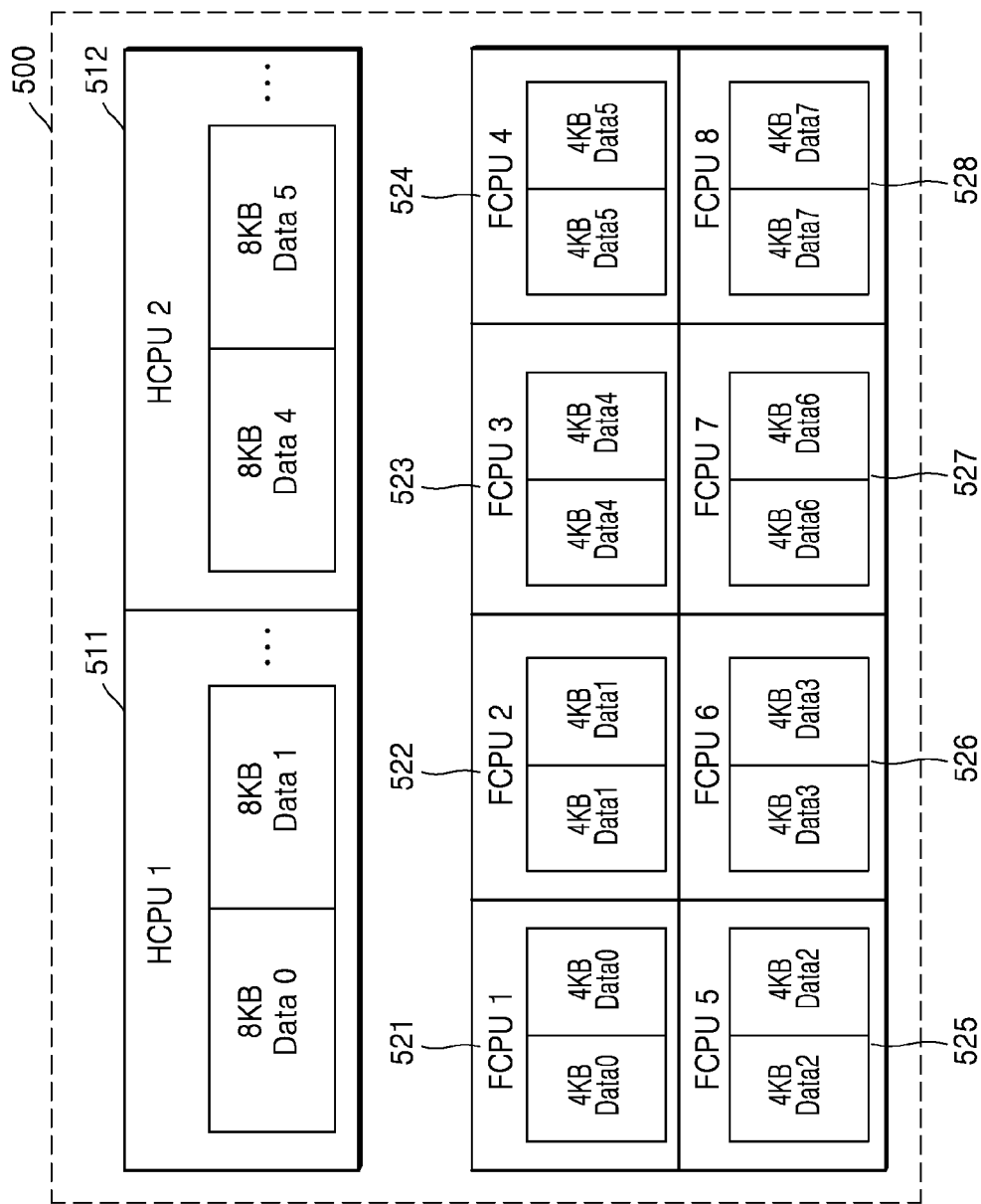

FIG. 13 illustrates an example in which multiple HCPUs are provided in a non-volatile memory system. Furthermore, a first mapping unit of each HCPU is set to 8 KB and a second mapping unit of each FCPU is set to 4 KB. As illustrated in FIG. 13, a non-volatile memory system 500 may include first and second HCPUs 511 and 512. Furthermore, the non-volatile memory system 500 may include multiple FCPUs, for example, first to eighth FCPUs 521 to 528.

When data access requests are received from a host, the first and second HCPUs 511 and 512 respectively divide the requests by 8 KB mapping units and provide internal requests to the first to eighth FCPUs 521 to 528. For example, each of the first and second HCPUs 511 and 512 may process the requests from the host in parallel.

The first HCPU 511 may provide an access request for first data Data 0 to the first FCPU 521 and an access request for the second FCPU 522 to the second data Data 1. Furthermore, the second HCPU 512 may provide an access request for fifth data Data 4 to the third FCPU 523 and an access request for sixth data Data 5 to the fourth FCPU 524. Furthermore, the first HCPU 511 may provide an access request for third data Data 2 to the fifth FCPU 525 and an access request for fourth data Data 3 to the sixth FCPU 526. Furthermore, the second HCPU 512 may provide an access request for seventh data Data 6 to the seventh FCPU 527 and an access request for eighth data Data 7 to the eighth FCPU 528.

Each of the first to eighth FCPUs 521 to 528 may divide an access request of 8 KB into 4 KB according to the second mapping units and access a memory. For example, the first FCPU 521 may access the first data Data 0 of 8 KB by dividing into two pieces of 4 KB of data, respectively.

According to the embodiment of FIG. 13, when a data processing speed of each HCPU is 1000 MB/s and that of each FCPU is 500 MB/s, it is possible to realize the data processing speed of 4000 MB/s by using two HCPUs having mapping units set to 8 KB and eight FCPUs having mapping units set to 4 KB. In other words, it is possible to minimize the number of HCPUs added to improve a speed of the non-volatile memory system 500.

Figure 14:
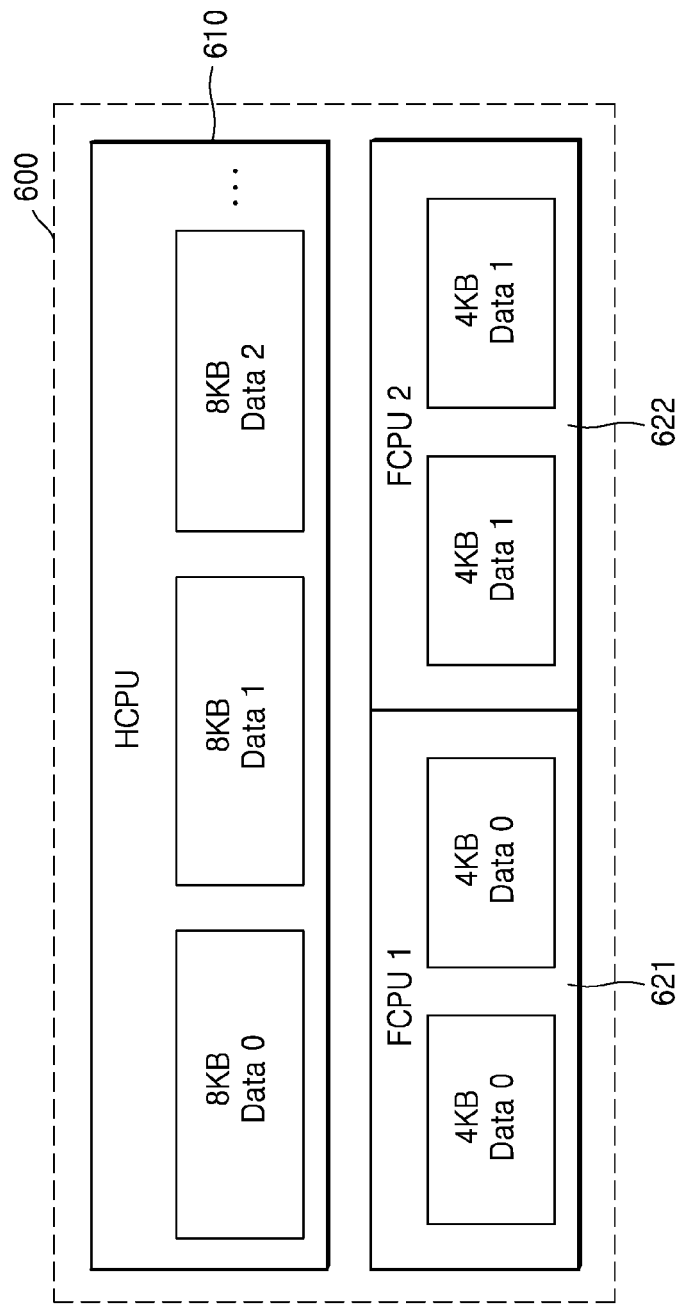

FIG. 14 illustrates an embodiment in which an operating speed of an HCPU is equal to those of FCPUs that are provided in a non-volatile memory system. For example, data processing speed of the HCPU and the FCPUs may each be 500 MB/s. Furthermore, for example, a first mapping unit of the HCPU is set to 8 KB and a second mapping unit of each of the FCPUs is set to 4 KB.

As illustrated in FIG. 14, a non-volatile memory system 600 may include an HCPU 610 and first and second FCPUs 621 and 622. However, this is only an embodiment; in the non-volatile memory system 600 according to other embodiments, the number of HCPUs and FCPUs having the same operating speed may be different.

Since data processing speeds of the HCPU and the FCPUs are the same as each other, for example, 500 MB/s, two HCPUs and two FCPUs will be necessary in order to improve a data processing speed of the non-volatile memory system 600 to 1000 MB/s. However, according to an embodiment, by setting the first mapping unit of the HCPU 610 to 8 KB, a data request from a host is divided into 8 KB units and the divided requests are respectively provided to the first and second FCPUs 621 and 622. Each of the first and second FCPUs 621 and 622 may access data by dividing an internal request in 4 KB units.

According to the embodiment as described above, it is possible to prevent an increase in the number of HCPUs while improving an operating speed of the non-volatile memory system 600. For example, it is possible to improve a data processing speed of the non-volatile memory system 600 to 1000 MB/s with the HCPU 610 having a mapping unit of 8 KB only.

Figure 15:
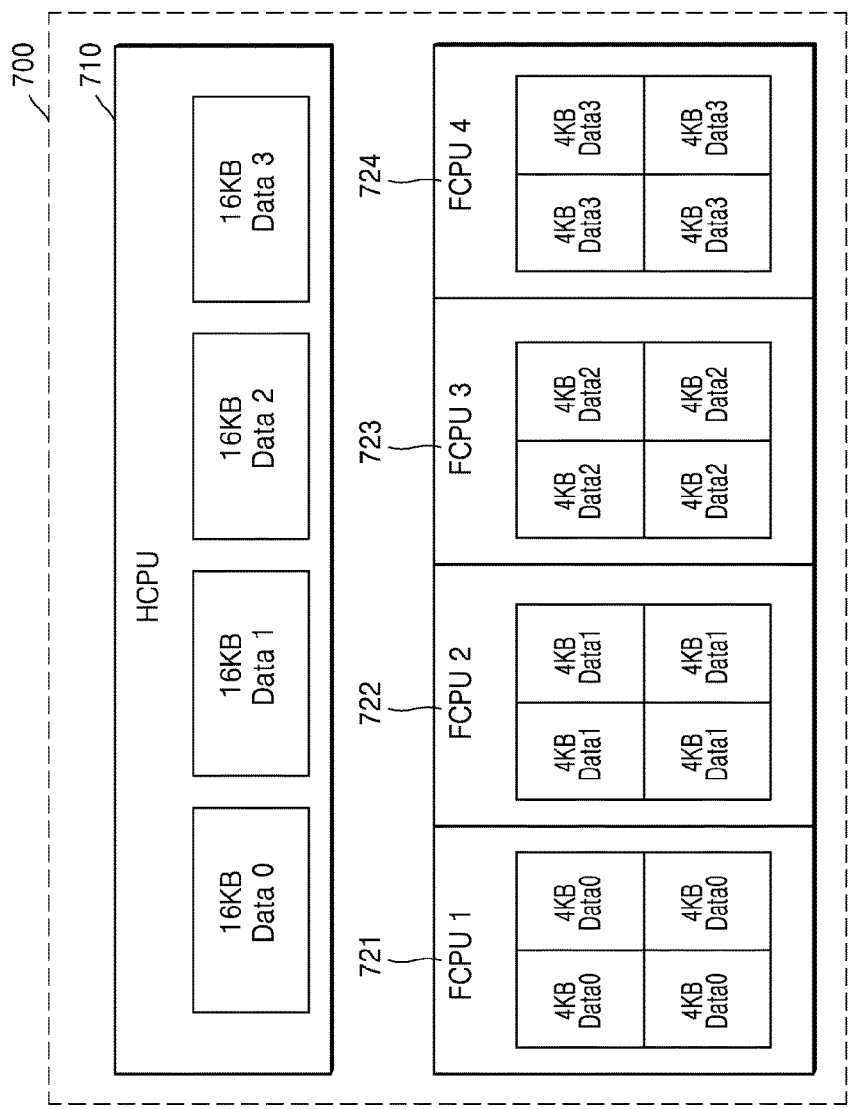

FIG. 15 illustrates an example in which a size of a first mapping unit of an HCPU is further increased compared to other embodiments when an operating speed of an HCPU is equal to those of FCPUs that are provided in a non-volatile memory system. For example, data processing speed of each of the HCPU and the FCPUs may be 500 MB/s. Furthermore, for example, the first mapping unit of the HCPU is set to 16 KB and second mapping units of each FCPU are set to 4 KB.

As illustrated in FIG. 15, a non-volatile memory system 700 may include an HCPU 710 and first to fourth FCPUs 721 to 724. When data access requests are received from a host, the HCPU 710 divides the requests by mapping units of 16 KB and provides internal requests to the first to fourth FCPUs 721 to 724. For example, an access request for first data Data 0 of 16 KB may be provided to the first FCPU 721 and an access request for second data Data 1 may be provided to the second FCPU 722. According to the method as described above, the access requests may be equally provided to the first to fourth FCPUs 721 to 724 by 16 KB units.

The first to fourth FCPUs 721 to 724 may access data by dividing each internal request of 16 KB (i.e., request for transferring 16 KB of data) according to the second mapping units into 4 KB units. According to the embodiment as described above, it is possible to improve a data processing speed of the non-volatile memory system 700 from to 2000 MB/s with the HCPU 710 having a mapping unit of 16 KB.

Figure 16:
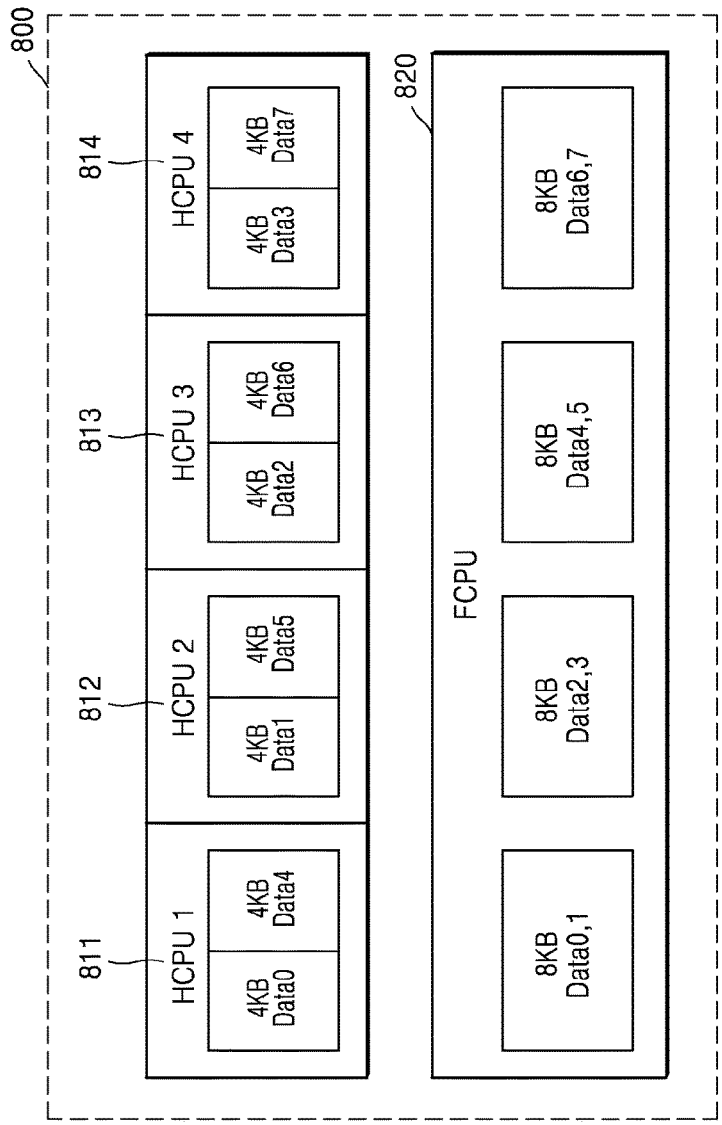
Figure 17:
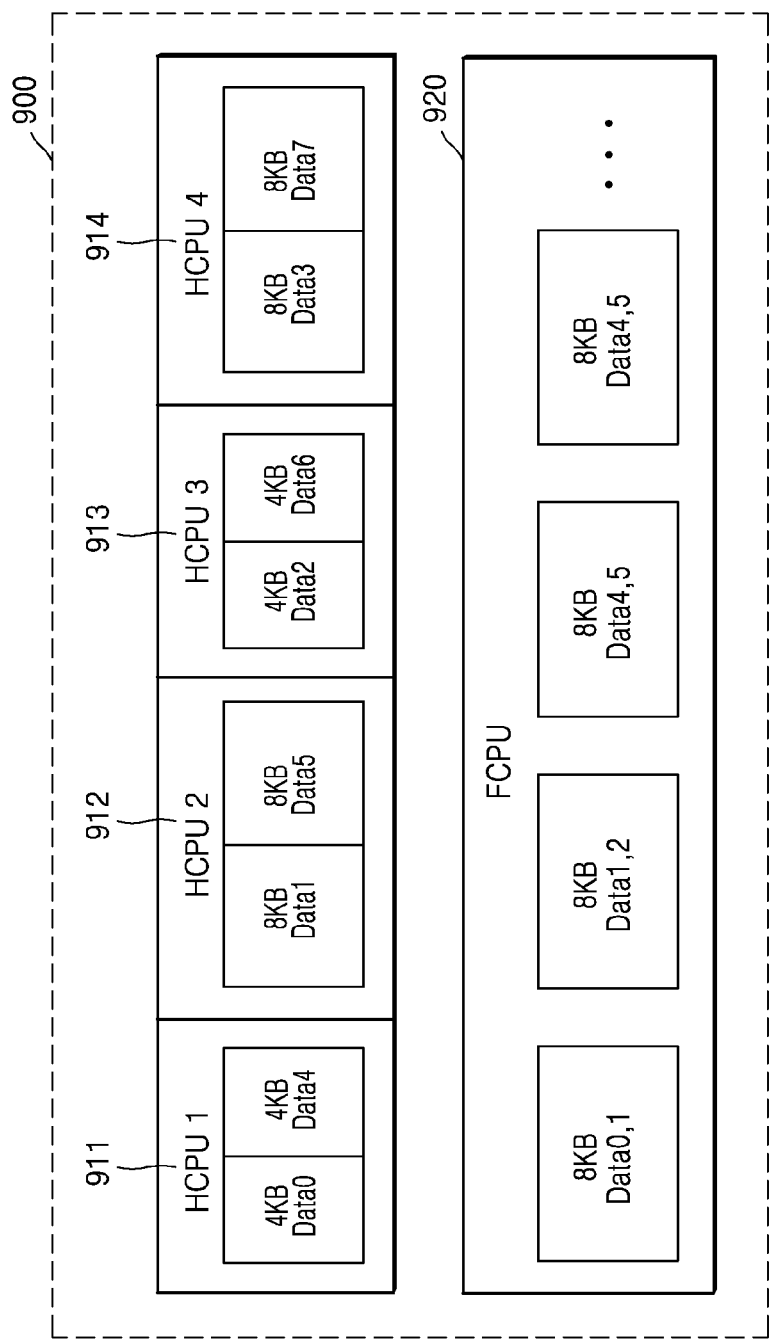

FIGS. 16 and 17 illustrate examples of non-volatile memory system in which mapping units of HCPUs are different from that of an FCPU that are provided in a non-volatile memory system, and further, in which the number of HCPUs is further larger than the number of FCPUs. Furthermore, for example, a data processing speed of each of the HCPUs may be 500 MB/s and that of the FCPU may be 1000 MB/s. Furthermore, for example, a mapping unit of each of the HCPUs is set to 4 KB and that of the FCPU is set to 8 KB.

As illustrated in FIG. 16, a non-volatile memory system 800 may include first to fourth HCPUs 811 to 814 and an FCPU 820. However, in other embodiments, the number HCPUs and FCPUs included in the non-volatile memory system 800 may be different.

Each of the first to fourth HCPUs 811 to 814 may process data access requests from a host according to a first mapping unit of 4 KB. For example, referring to a data access request of 32 KB, the first to fourth HCPUs 811 to 814 may respectively divide the request according to a mapping unit of 4 KB and may provide internal requests to the FCPU 820. For example, referring to first 16 KB of the 32 KB of data, the first to fourth HCPUs 811 to 814 may provide internal requests for access to first to fourth data Data 0 to Data 3 of 4 KB to the FCPU 820, respectively. Furthermore, referring to the next 16 KB of data, the first to fourth HCPUs 811 to 814 may provide internal requests for access to fifth to eighth data Data 4 to Data 7 of 4 KB to the FCPU 820, respectively.

The FCPU 820 may access a memory according to a second mapping unit of 8 KB. For example, the FCPU 820 may access the memory by dividing requests from the first to fourth HCPUs 811 to 814 in 8 KB units. As an example of operation, the FCPU 820 may access the first and second data Data 0 and Data 1 using one 8 KB unit, and similarly, may access the next third and fourth data Data 2 and Data 3 as one 8 KB unit. Other 4 KB units of data may be similarly combined into 8 KB units.

According to an embodiment of FIG. 16, it is possible to realize a data processing speed of 2000 MB/s by four HCPUs formed in the non-volatile memory system 800. Furthermore, referring to one FCPU with a data processing speed of 1000 MB/s, it is possible to realize a data processing speed of 2000 MB/s by the FCPU since the FCPU has a mapping unit two times larger than each of the HCPUs. In other words, it is possible to minimize the number of FCPUs in improving a speed of the non-volatile memory system 800.

FIG. 17 illustrates a non-volatile memory system 900 including multiple HCPUs 911 to 914 and an FCPU 920. Furthermore, the HCPUs 911 to 914 may have first mapping units different from each other; for example, the first and third HCPUs 911 and 913 may have first mapping units of 4 KB, and the second and fourth HCPUs 912 and 914 may have first mapping units of 8 KB. Furthermore, the FCPU 920 may have a second mapping unit of 8 KB.

According to access requests received from a host, the first to fourth HCPUs 911 to 914 may respectively process the access requests by corresponding mapping units. For example, the first HCPU 911 may provide an internal request for accessing first data Data 0 of 4 KB to the FCPU 920 and the second HCPU 912 may provide an internal request for accessing second data Data 1 of 8 KB to the FCPU 920. In a similar way, the third HCPU 913 may provide an internal request for accessing third data Data 2 of 4 KB to the FCPU 920 and the fourth HCPU 914 may provide an internal request for accessing fourth data Data 3 of 8 KB to the FCPU 920.

The FCPU 920 may access a memory by processing the internal requests provided from the first to fourth HCPUs 911 to 914. The FCPU 920 may process the internal requests from the first to fourth HCPUs 911 to 914 using various methods. As illustrated in FIG. 17, according to an example of operation, the FCPU 920 may couple the first data Data 0 and a part, i.e., 4 KB, of second data Data 1 and may access the first and second data Data 0 and Data 1 as one unit, accessing data according to 8 KB units. Furthermore, since a size of the fourth data Data 3 is the same as that of the second mapping unit, it is possible to access a memory without any splitting/coupling operations for the fourth data Data 3 of 8 KB. Similar to the 4 KB of first data Data 0 and the 4 KB portion of the 8 KB second data Data 1, the 4 KB of fifth data Data 4 may be combined with a 4 KB portion of the 8 KB sixth data Data 5. In other embodiments, the FCPU 920 may selectively couple two of the internal requests provided in 4 KB units and access data in 8 KB units without splitting operations. For example, the 4 KB first data Data 0 and the 4 KB fifth data Data 4 may be combined according to a single second mapping unit of 8 KB while each of the 8 KB second data Data 1 and the 8 KB sixth data Data5 may be accessed with a corresponding second mapping unit of 8 KB.

Figure 18:
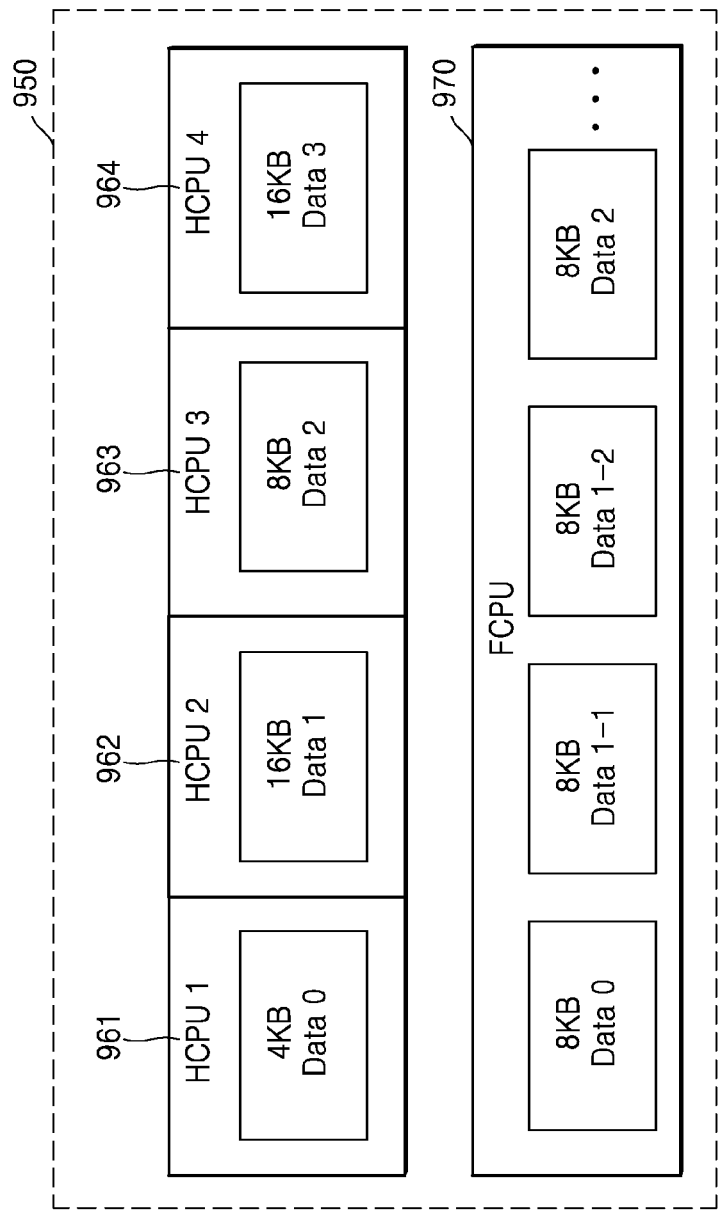

FIG. 18 illustrates a non-volatile memory system 950 including first to fourth HCPUs 961 to 964 and an FCPU 970. The HCPUs 961 and 963 have first mapping units of 8 KB. The HCPUs 962 and 964 have first mapping units of 16 KB. The FCPU 970 has a second mapping unit of 8 KB.

The FCPU 970 may access a memory by processing the internal requests provided from the first to fourth HCPUs 961 to 964. The FCPU 970 may process the internal requests from the first to fourth HCPUs 961 to 964 using various methods. As illustrated in FIG. 18, according to an example of operation, the FCPU 970 may access first and third data Data 0 and Data 2 using single second mapping units of 8 KB for each. However, the larger 8 KB first mapping unit of second data Data 1 is split into two second mapping units Data 1-1 and Data 1-2.

Although different numbers of HCPUs, FCPUs, first mapping units, second mapping units, or the like have been used as examples, in other embodiments, the HCPUs, FCPUs, first mapping units, second mapping units, or the like may be the same or different.

Embodiments include a non-volatile memory system capable of improving operating speeds of resources such as a central processing unit (CPU) while minimizing an increase in resources, and an operating method thereof.

Some embodiments include a method of operating a non-volatile memory system includes receiving an access request from a host, generating internal requests by processing the access request by a first central processing unit (CPU) according to a first mapping unit having a first size, and accessing a memory by processing the internal requests by a second CPU according to a second mapping unit having a second size.

Some embodiments include a method of operating a non-volatile memory system includes generating internal requests by processing an access request from outside the non-volatile memory system according to a first mapping unit having a first size, generating a first logical address indicating a logical location of data corresponding to the internal requests, generating a command by processing the internal requests according to a second mapping unit having a second size, generating, based on the first logical address, a physical address indicating a logical location of data corresponding to the second size, and accessing data according to the command and the physical address.

Figure 19A:
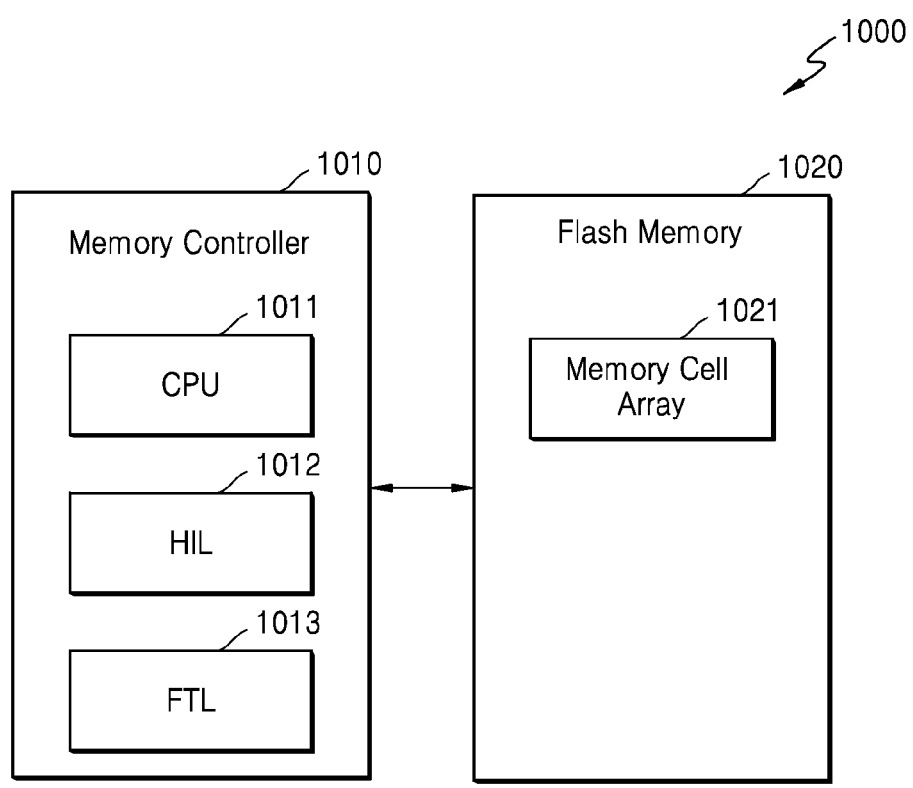
FIGS. 19A and 19B are block diagrams illustrating a non-volatile memory system, according to some embodiments.
Figure 19B:
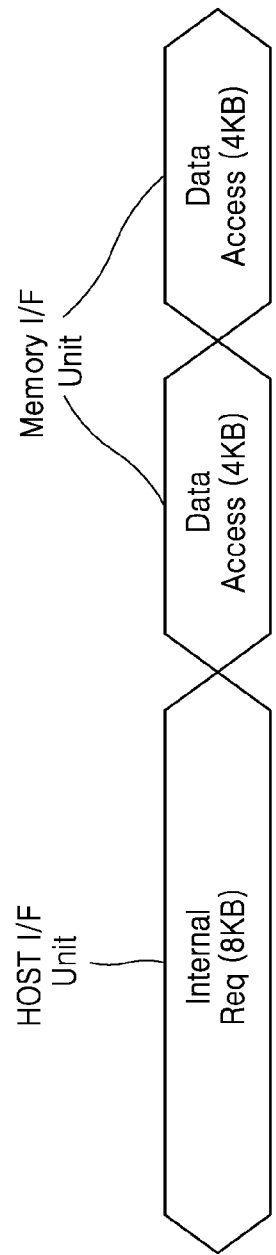

FIGS. 19A and 19B are block diagrams illustrating a non-volatile memory system 1000, according to some embodiments. The non-volatile memory system 1000 may include a memory controller 1010 and a non-volatile memory device 1020. For example, the non-volatile memory device 1020 may be a flash memory device and may include a memory cell array 1021. Furthermore, the memory controller 1010 may include a central processing unit, and further, may include a host interface layer (HIL) 1012 for performing various operations related to an interface with a host and a flash translation layer (FTL) 1013 for a memory interface. Similar to the above embodiments, the HIL 1012 and the FTL 1013 may be realized as firmware and may be loaded on a working memory (not shown) in the memory controller 1010.

A CPU 1011 may be configured to perform a host interface operation according to the some embodiments described above by executing the HIL 1012 and may generate internal requests by processing requests from a host according to a first mapping unit. Furthermore, the CPU 1011 may be configured to access a memory according to a second mapping unit by executing the FTL 1013. In other words, the CPU 1011 may be configured to control the non-volatile memory system 1000 so that data may be accessed while processing the requests from the host according to the first and second mapping units having different sizes from each other.

According to some embodiments as described above, as illustrated in FIG. 19B, the host interface operation may be performed once according to 8 KB units and twice according to 4 KB units. In other words, in accessing the same amount of data, an operating speed of the non-volatile memory system 1000 may be improved as the host interface operation may be reduced to being performed only once compared to the case in which the host interface operation is performed twice according to 4 KB units and the accessing of the memory is performed twice according to 4 KB units.

Figure 20:
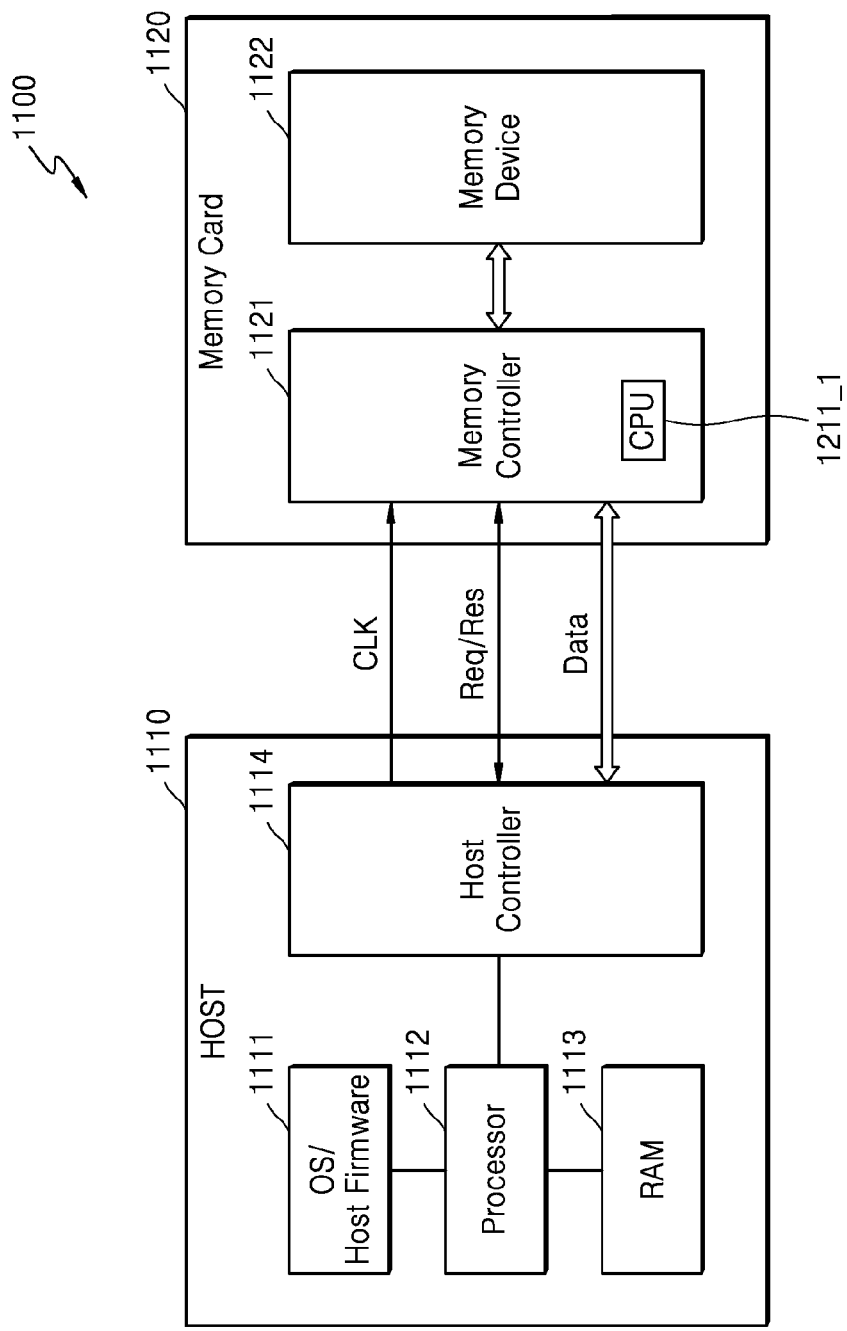
FIG. 20 is a block diagram of a memory card system according to an embodiment.

FIG. 20 is a block diagram of a memory card system according to an embodiment.

As illustrated in FIG. 20, a memory card system 1100 may include a host 1110 and a memory card 1120. The memory card system 1100 may be an electronic device in which a memory card is installed. For example, the electronic device may include a mobile phone, a smart phone, a tablet PC, a personal digital assistant (PDA), an enterprise digital assistant (EDA), a digital still camera, a digital video camera, an audio device, a portable multimedia player (PMP), a PND (personal navigation device or portable navigation device), an MP3 player, a handheld game console, or an e-book.

A variety of memory cards 1120 may be used in the memory card system 1100. In some embodiments, the memory card 1120 may be an eMMC; however, the memory card 1120 may have other forms in other embodiments.

The host 1110 may be configured to receive a request for an access operation such as data reading and writing to the memory card 1120. The host 1110 is a device capable of processing data and may be or include a CPU, a processor, a microprocessor, an application processor, application specific integrated circuit, a microcontroller, a programmable logic device, discrete circuits, a combination of such devices, or the like.

The host 1110 may include various components to control the memory card 1120. For example, the host 1110 may include an operation system/host firmware 1111, a processor 1112, RAM 1113, and a host controller 1114. The processor 1112 may be configured to operate the operation system/host firmware 1111 by software. Furthermore, the host 1110 may further include a clock generator (not shown) configured to generate a clock signal CLK to be used in the memory card 1120. The host 1110 may be configured to provide a data access request Req to the memory card 1120 and receive a request response Res from the memory card 1120. According to the data access request Req, written data and read data Data may be transmitted between the host 1110 and the memory card 1120.

The memory card 1120 may include a memory controller 1121 and a memory device 1122. The memory controller 1121 may include at least one central processing unit 1121_1 according to one or more embodiments described above. In other words, the memory controller 1121 may include a central processing unit or at least one HCPU and at least one FCPU.

According to the above embodiments, the memory controller 1121 may be configured to perform a processing operation according to at least two mapping units while processing the data access request Req from the host 1110. For example, the central processing unit 1121_1 may include an HCPU and an FCPU, in which a mapping unit of the HCPU may be set different from that of the FCPU. Alternatively, as in other embodiments, a host interface layer (HIL) and a flash translation layer (FTL) may be loaded in the memory controller 1121 as firmware, and the central processing unit 1121_1 may generate internal requests according to a first mapping unit by executing the HIL and may access data according to a second mapping unit by executing the FTL, according to the embodiments illustrated in FIGS. 19A and 19B.

According to an embodiment, a flash memory device, which may be provided in a non-volatile memory system, may include a 3D (or vertical) NAND (VNAND) memory array.

The 3D memory array is arrays of memory cells having an active region arranged on a silicon substrate or a circuit related to operations of the memory cells, and is monolithically formed on the substrate or on at least one physical level of the circuit formed in the substrate. The "monolithically" means that layers of each level comprising the array are laminated right on layers of each lower level in the array.

According to an embodiment, the 3D memory array includes vertical NAND strings arranged vertically so that at least one memory cell is located on other memory cells. The at least one memory cell may include a charge trap layer.

U.S. Pat. Nos. 7,679,133, 8,553,466, 8,654,587, and 8,559,235, and U.S. Patent Publication 2011/0233648 describe suitable configurations of a 3D memory array formed of multiple levels and in which word lines and/or bit lines are shared between the levels, and may be incorporated in the present disclosure by reference.

According to a non-volatile memory system and an operating method thereof of one or more embodiments, it is possible to improve performance of the non-volatile memory system while minimizing an increase in the number of CPUs formed in the non-volatile memory system.

Furthermore, according to a non-volatile memory system and an operating method thereof of one or more embodiments, it is possible to use a resource of the CPU as a first CPU accessing a memory and a second CPU processing a host interface are formed in the non-volatile memory system with suitable numbers according to data processing speeds and mapping units.

While embodiments have been particularly shown and described with reference to particular embodiments, it will be understood that various changes in form and details may be made therein without departing from the spirit and scope of the following claims.

What is claimed is:

1. A method of operating a non-volatile memory system, the method comprising:
   receiving an access request from a host;
   generating internal requests by processing the access request by a first central processing unit (CPU) according to a first mapping unit having a first size, wherein each of the internal requests comprises a request for data having a same size of the first size, and the first CPU is one of at least one first CPU; and
   accessing a memory by processing the internal requests by a second CPU according to a second mapping unit having a second size, wherein the second CPU is one of at least one second CPU,
   wherein the first size is different from the second size, and the first size is larger than the second size when a number of the at least one first CPU is smaller than a number of the at least one of second CPU.

2. The method of claim 1, wherein:
   the second CPU is one of a plurality of second CPUs; and
   the processing of the internal requests comprises processing the internal requests by the second CPUs according to the second mapping unit.

3. The method of claim 2, wherein:
the first CPU is one of a plurality of first CPUs; and
the processing of the access request by the first CPUs according to the first mapping unit.

4. The method of claim 1, wherein:
a data processing speed of the first CPU is faster than that of the second CPU.

5. The method of claim 1,
wherein the generating of the internal requests further comprises:
dividing the access request into a plurality of internal requests; and
for each of the internal requests, generating a first logical address corresponding to the internal request.

6. The method of claim 5, wherein the accessing of the memory further comprises:
generating, based on the first logical address, a plurality of second logical addresses each indicating a logical location of data corresponding to the second size; and
for each of the second logical addresses:
converting the second logical address into a physical address; and
accessing data by providing the physical address to the memory.

7. The method of claim 1, wherein:
the memory comprises memory cell arrays;
each of the memory cell arrays comprises at least one block;
each of the blocks comprises a plurality of pages;
the first size is equal to M times a page size of each of the pages;
the second size is equal to the page size of each of the pages; and
M is an integer of 2 or greater.

8. The method of claim 1, wherein:
an operating speed of the at least one first CPU is equal to that of the at least one second CPU;
a ratio of a number of the at least one first CPU and a number of the at least one second CPU is N;
N is an integer of 2 or greater; and
the first size is equal to N times the second size.

9. The method of claim 1, wherein:
an operating speed of the at least one first CPU is A times faster than that of the at least one second CPU;
a ratio of a number of the at least one first CPU and a number of the at least one second CPU is A*N;
the first size is equal to N times the second size; and
each of A and N is an integer of 2 or greater.

10. The method of claim 1, wherein:
the second CPU is one of a plurality of second CPUs; and
the size of the second mapping unit of at least one of the second CPUs is different from the size of the second mapping unit of at least one other one of the second CPUs.

11. A method of operating a non-volatile memory system, the method comprising:
receiving an access request by the non-volatile memory system;
generating internal requests by processing the access request according to a first mapping unit having a first size, wherein each of the internal requests comprises a request for data having a same size of the first size;
generating a first logical address indicating a logical location of data corresponding to the internal requests;
generating a command by processing the internal requests according to a second mapping unit having a second size;
generating, based on the first logical address, a second logical address indicating a logical location of data corresponding to the second size;
converting the second logical address into a physical address based on an address mapping table; and
accessing data according to the command and the physical address.

12. The method of claim 11, wherein:
generating of the internal requests further comprises generating the internal requests by a host interface layer executing on a central processing unit (CPU); and
generating of the command further comprises generating the command by a flash translation layer executing on the CPU.

13. The method of claim 11, wherein:
generating of the internal requests further comprises generating the internal requests by a first CPU executing a host interface operation according to the first mapping unit, and
generating of the command further comprises generating the command by a second CPU accessing a memory according to the second mapping unit.

14. A method of operating a non-volatile memory system, the method comprising:
receiving an access request from a host;
dividing the access request into at least one internal request according to a first mapping unit, wherein at least one internal request each comprises a request for data having a same size of the first mapping unit;
generating at least one command by reorganizing each of the at least one internal request according to a second mapping unit combining a first one of the internal requests and a portion of a second one of the internal requests into a command; and
accessing a memory with the at least one command,
wherein a size of the first mapping unit is different from a size of the second mapping unit.

15. The method of claim 14,
wherein reorganizing each of the at least one internal request comprises dividing each internal request into N commands, each command associated with 1/N of data of the associated internal request and N is an integer of 2 or greater.

16. The method of claim 14,
wherein reorganizing each of the at least one internal request further comprises combining a third one of the internal requests and another portion of the second one of the internal requests into a command.

* * * * *